United States Patent
Miyamoto

(10) Patent No.: US 6,195,212 B1
(45) Date of Patent: Feb. 27, 2001

(54) VARIABLE FOCAL LENGTH LENS BARREL

(75) Inventor: Hidenori Miyamoto, Urayasu (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/429,921

(22) Filed: Oct. 29, 1999

(30) Foreign Application Priority Data

Nov. 11, 1998 (JP) .................................... 10-320913
Nov. 11, 1998 (JP) .................................... 10-320914

(51) Int. Cl.⁷ .................................................. G02B 13/10
(52) U.S. Cl. ........................... 359/699; 359/700; 359/694
(58) Field of Search ..................................... 359/699, 700, 359/701, 694

(56) References Cited

U.S. PATENT DOCUMENTS 4,069,724 * 1/1978 Sobotta ................................... 74/569
6,002,531 * 12/1999 Nakashima et al. .................. 359/700

* cited by examiner

Primary Examiner—Georgia Epps
Assistant Examiner—Tim Thompson

(57) ABSTRACT

A variable focal length lens barrel is constructed so that a complex lead thread and a cam groove can be provided in overlap on one barrel, and a crest of a helicoid thread meshing with the complex lead thread does not come off a root of the complex lead thread. For this construction, according to the present invention, an inner surface of a second driving barrel is formed with six streaks of complex lead threads and three streaks of cam grooves in overlap. In the complex lead threads, a root of a first lead thread having a first lead is connected via a bending portion to a root of a second lead thread having a second lead. The complex lead thread and the cam groove are disposed so at not to intersect each other at the bending portion.

4 Claims, 13 Drawing Sheets

FIG. 2

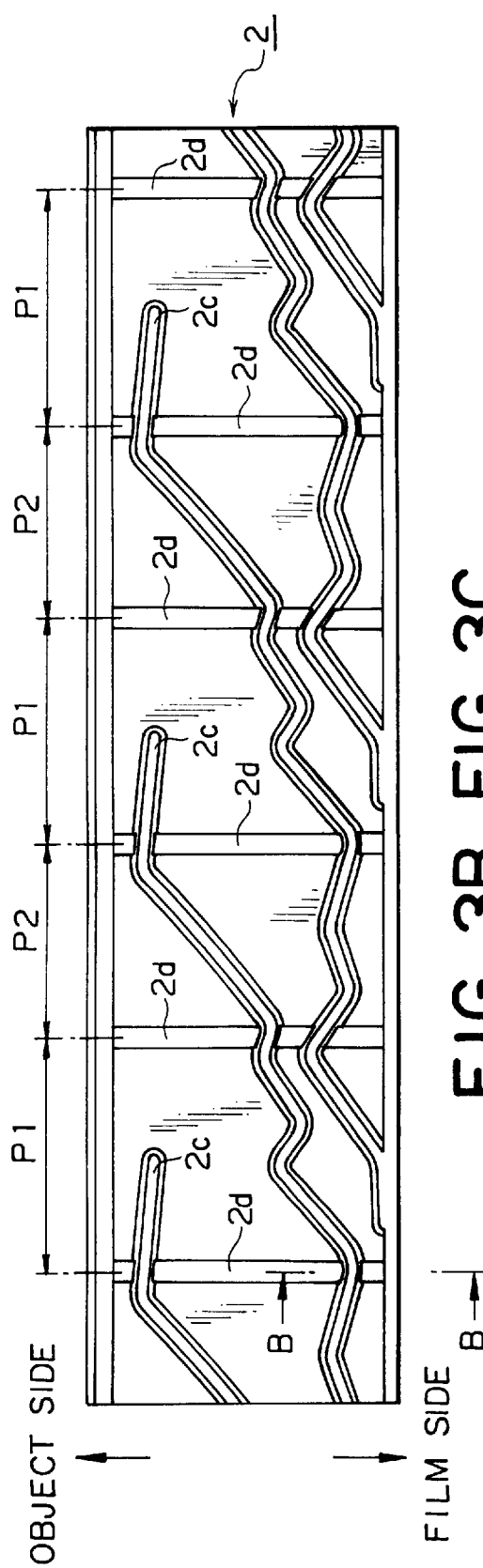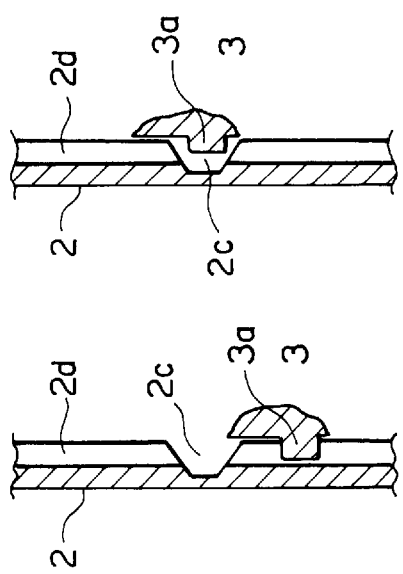

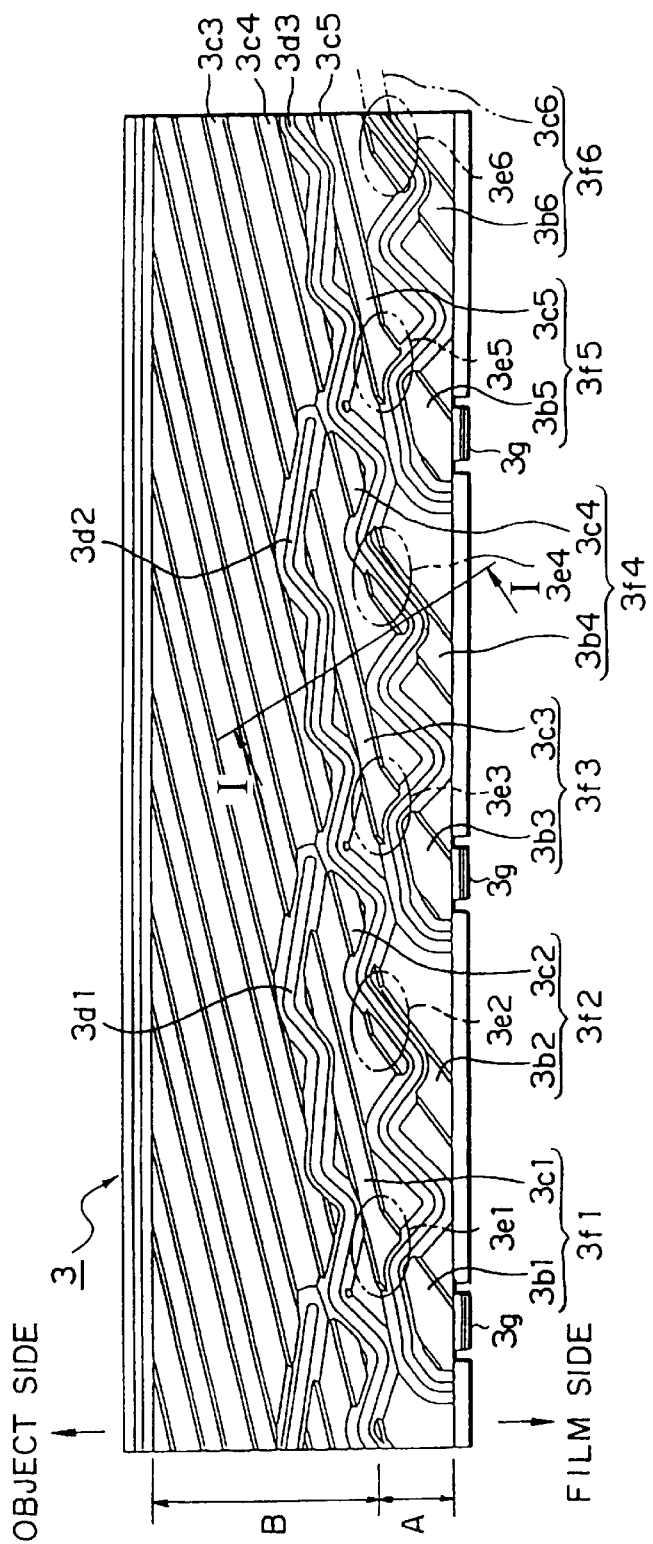
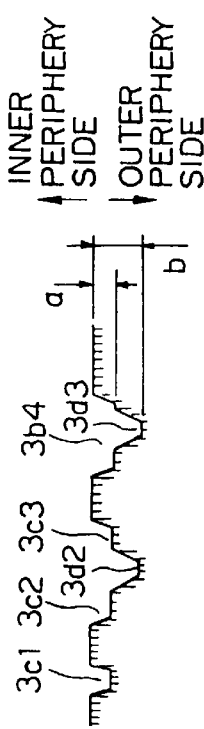
FIG. 4A
FIG. 4B

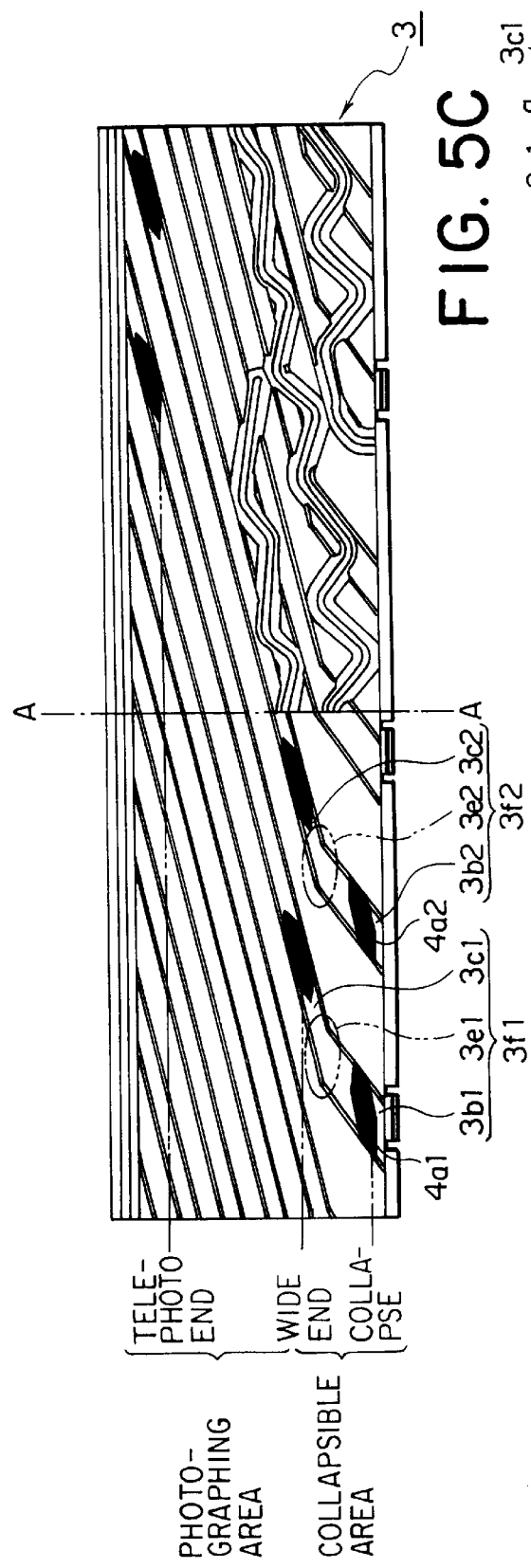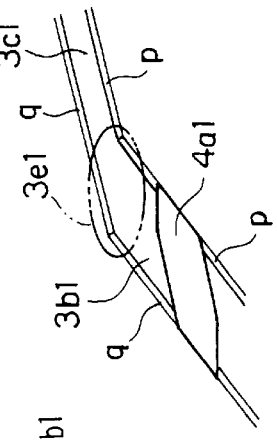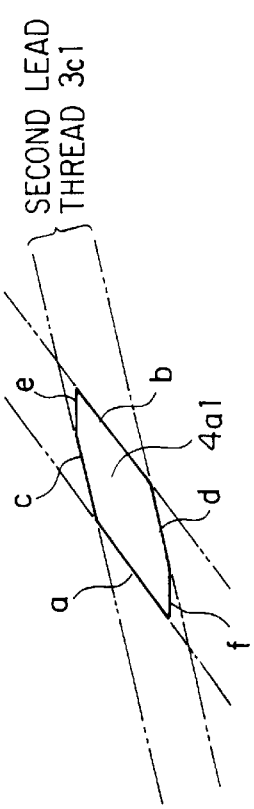

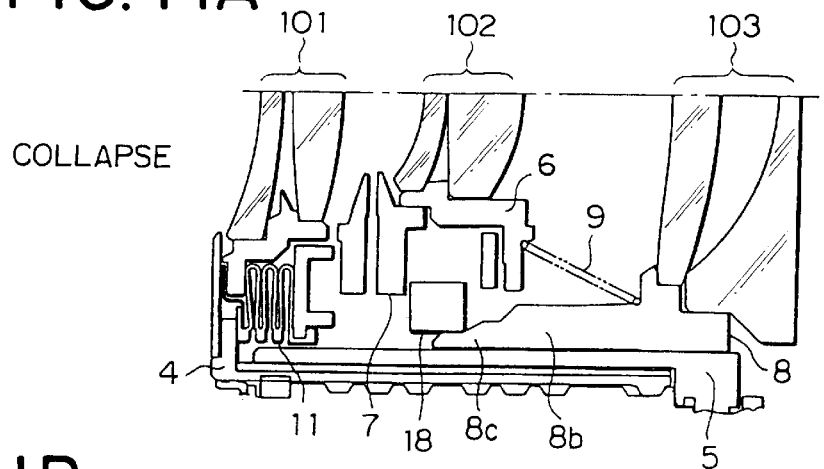
FIG. 11A COLLAPSE
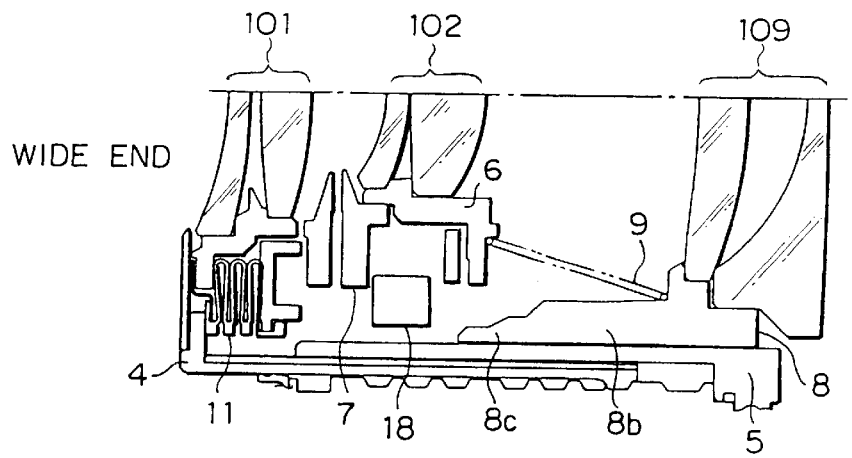
FIG. 11B WIDE END
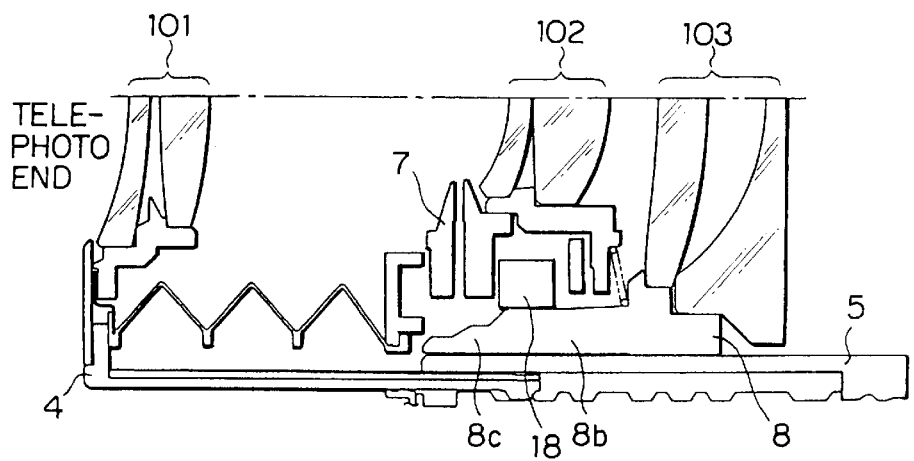
FIG. 11C TELEPHOTO END

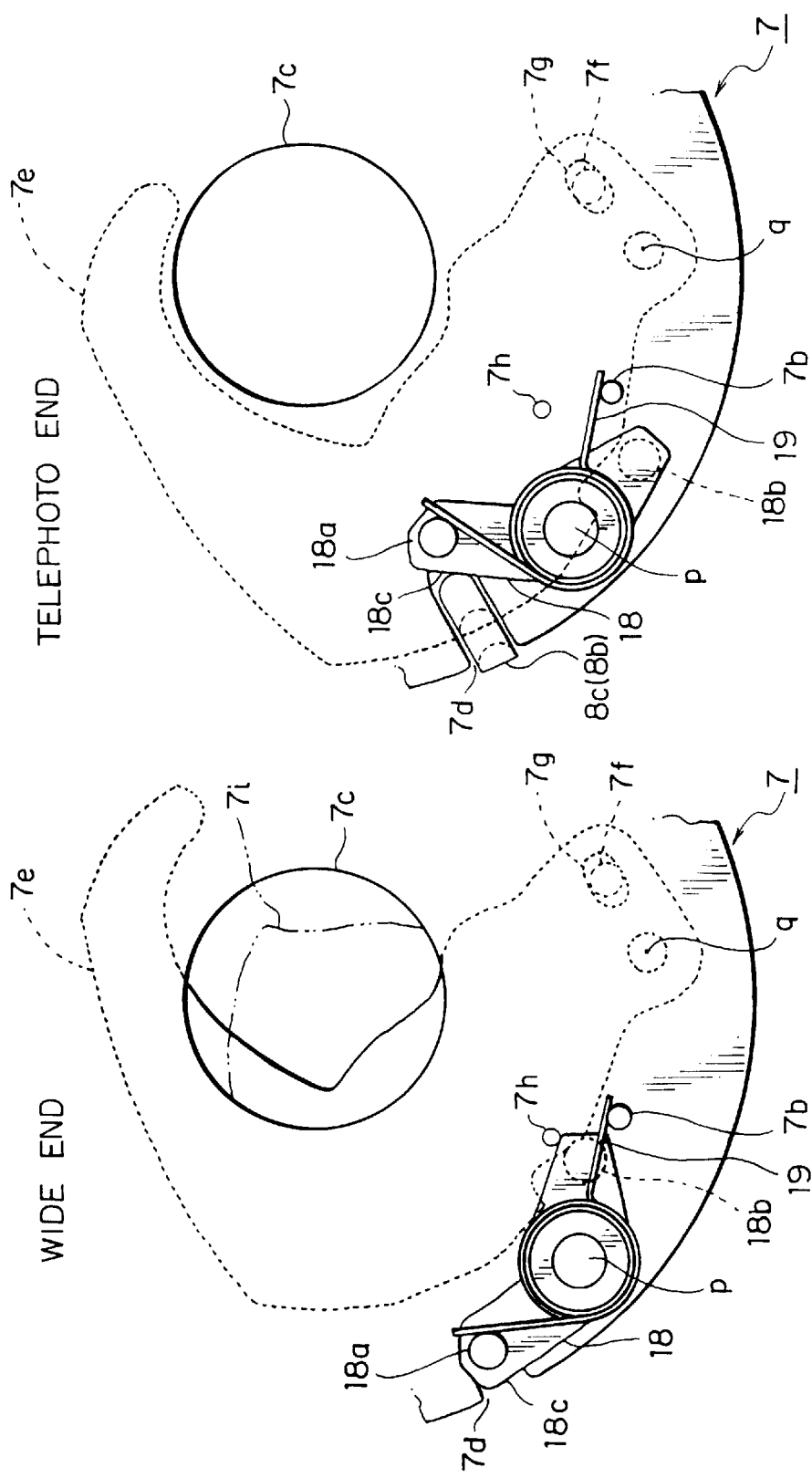

FIG. 13

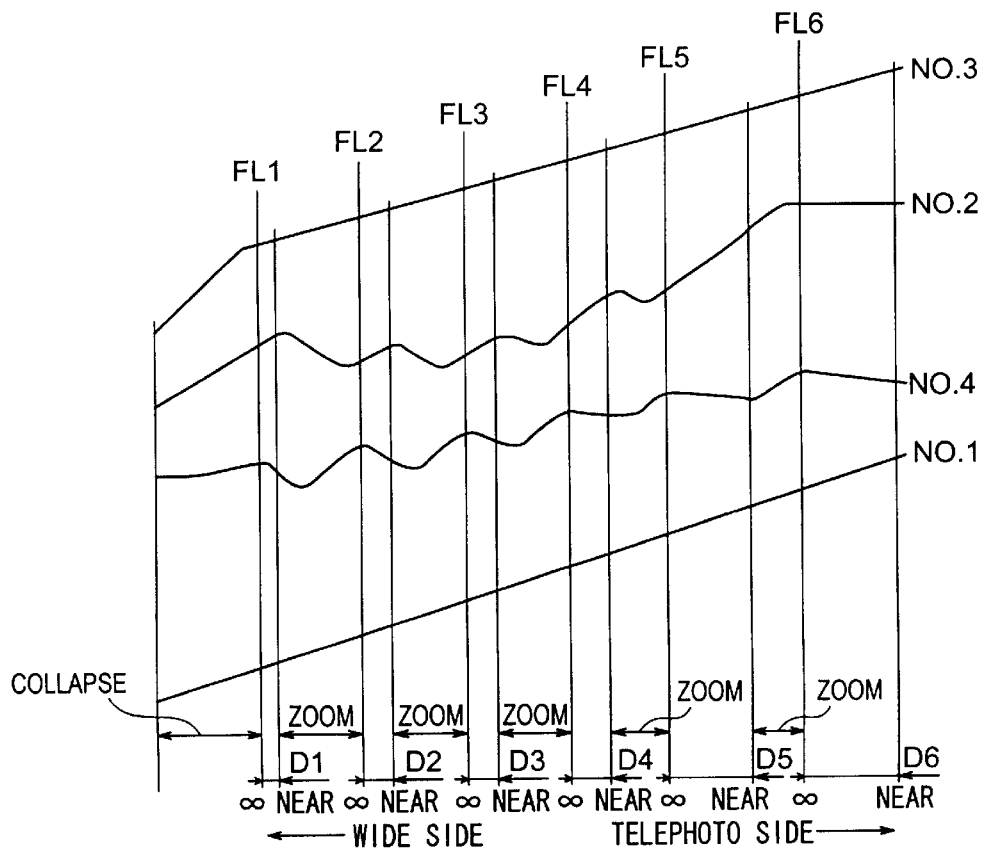

NO. 1 : FIXED BARREL 1 (FEMALE HELICOID THREAD 1a)~FIRST DRIVING BARREL 2 (MALE HELICOID THREAD 2a)
NO. 2 : FIRST DRIVING BARREL 2 (CAM GROOVE 2c)~SECOND DRIVING BARREL 3 (FOLLOWER PIN 5c OF RECTILINEAR ADVANCED GUIDE)
NO. 3 : SECOND DRIVING BARREL 3 (COMPLEX LEAD THREAD 3f)~FIRST GROUP BARREL 4 (MALE HELICOID THREAD 4a)
NO. 4 : SECOND DRIVING BARREL 3 (CAM GROOVE 3d)~THIRD GROUP LENS FRAME 8 (FOLLOWER PIN 8a)

THE MOVEMENT OF THE FIRST LENS GROUP 101:No.1+No.2+No.3
THE MOVEMENT OF THE SECOND LENS GROUP102:No.1+No.2
THE MOVEMENT OF THE THIRD LENS GROUP 103:No.1+No.2+No.4

VARIABLE FOCAL LENGTH LENS BARREL

This application claims the benefit of Japanese Applications Nos.10-320913 and 10-320914 which are hereby incorporated by reference.

BACKGROUND OF THE INVENTION

1. Field of the Invention

The present invention relates to a variable focal length lens barrel.

2. Related Background Art

Japanese Patent Application Laid-Open Publication No.10-31150 discloses a lens group moving mechanism for a variable focal length lens in the prior art, which is constructed to attain a decrease in thickness of a camera by increasing a moving quantity for a collapsing operation without any rises both in length and diameter of a lens barrel. A configuration of this mechanism is that a width-enlarged portion with an enlarged width of a thread root is formed in a part of a female helicoid thread of a multi-streaks thread, and a dimension of length of the width-enlarged portion in a direction along the helix Is equalized to a length of crest of a male helicoid thread in the direction along. the helix, which meshes with the female helicoid thread. With this configuration, it is possible to obtain thread-fitting having a comparatively small lead at a portion with a non-enlarged width of the root of the thread, and a thread fitting having a comparatively large lead at the portion with the enlarged-width of the root. That is, a dimension in section right-angled to the helix with respect to the crest of the male helicoid thread is defined as a "width", while a length in the direction along the helix is defined as a "length". In this case, the male helicoid thread and the female helicoid thread mesh with each other over the "width" or the "length" thereof. Then, in the case of meshing over the "width", there is acquired a thread fitting state having a comparatively small lead. In the case of meshing over the "length", there is obtained a thread fitting state having a comparatively large lead. The complex lead threads having two leads different from each other can be obtained in the way described above.

Further, Japanese Patent Application Laid-Open Publication No. 3-209445 discloses a technology of reducing the number of parts of the helicoid thread and the cam for moving the lens groups. According to this technology, one single cam ring is formed with both a cam groove and a lead thread.

If the complex lead thread and the cam groove are formed in overlap in an internal peripheral surface of a cylindrical member of the single cam ring, the cam groove might extend across a portion where the lead changes, i.e., a bending portion of a root of the female helicoid thread. At this time, a side wall of the bending portion of the helicoid thread is separated by the cam groove, resulting in a deficient state.

When the crest of the male helicoid thread meshing over the "width" is on the verge of reaching the separated bending portion, with the bending portion being in the as-deficient state, the same crest advances rectilinearly without being changed to the state of meshing over the "length", consequently comes off the root of the female helicoid thread, and drops down to the cam groove. As a result, a rotation of the cam ring is locked, and the variable focal length lens might be incapable of performing a zooming operation in some cases.

SUMAMRY OF THE INVENTION

It is a primary object of the present invention to provide a variable focal length lens barrel capable of providing a thread having a complex lead thread and a cam grove in overlap on one single cam barrel, and preventing a crest of a helicoid thread meshing with the complex lead thread from coming off a root of the complex lead thread.

To accomplish the above object, according to one aspect of the present invention, in the following description corresponding to the members in FIG. 1 showing in development an internal peripheral surface of the variable focal length lens barren in one embodiment, a variable focal length lens barrel comprises a bottomed cam groove $3d2$ having a first depth b, and a complex lead thread $3f1$ structured so that a root of a first lead thread $3b1$ having a first lead is connected via a bending portion $3e1$ to a root of a second lead thread $3c1$ having a second lead, this complex lead thread having a thread bottom of a second depth a shallower than the first depth b, wherein the cam groove and the complex lead thread are disposed in overlap on one single barrel. Then, the complex lead thread $3f1$ and the cam groove $3d2$ are disposed so as not to intersect each other at the bending portion $3e1$.

In the variable focal length lens barrel of the present invention, a plurality of cam grooves $3d1$–$3d3$ are provided, the complex lead threads $3f1$–$3f6$ are multi-streak threads having a plurality of streaks, and positions of disposing the plural streaks of complex lead threads $3f1$–$3f6$ and the plurality of cam grooves $3d1$–$3d3$ are determined so that the complex lead thread and the cam groove do not intersect each other at leastwise one bending portion among the bending portions $3e1$–$3e6$ included respectively in the plural streaks of complex lead threads.

In the variable focal length lens barrel, the number of the plural streaks of complex lead threads $3f1$–$3f6$ formed on the barrel is a multiple of integer that is equal to or more than twice the number of the cam grooves $3d1$–$3d3$ formed on the barrel.

BRIEF DESCRIPTION OF THE DRAWINGS

FIG. 2 is a vertical sectional view taken along an optical axis of the variable focal length lens barrel in the embodiment of the present invention;

FIGS. 3A–3C are explanatory view showing how a cam grove and a guide groove are formed in an inner surface of a first driving barrel;

FIGS. 4A and 4B are views showing how a complex lead thread and the cam groove are formed in an inner surface of a second driving barrel; FIG. 4A is the view showing how the inner surface of the second driving barrel is developed; and FIG. 4B is the sectional view taken along the line I—I in FIG. 4A;

FIGS. 5A–5C are views showing how the complex lead thread and a male helicoid thread formed in the inner surface of the second driving barrel mesh with each other; FIG. 5A is the view showing the whole inner surface of the second driving barrel; FIG. 5B is the partially enlarged view of the male helicoid thread; and FIG. 5C is the partially enlarged view showing a vicinity of a bending portion of the complex lead thread;

FIG. 9A is the view showing how the fixed barrel looks as viewed from the front; and FIG. 9B is the sectional view taken along the line I—I in FIG. 9A;

FIGS. 11A–11C are views showing how a positional relationship between a step cam and an aperture control lever changes corresponding to a zooming operation of the variable focal length lens barrel in the embodiment of the present invention; FIG. 1A is the view showing a state of being in the collapsed position; FIG. 11B is the view showing a state of being at the wide end; and FIG. 11C is the view showing a state of being at the telephoto end;

FIGS. 12A and 12B are explanatory views showing how an aperture of a sector is controlled by the aperture control lever; FIG. 12A is the view showing a state of being at the wide end; and FIG. 12B is the view showing a state of being at the telephoto end; and FIG. 13 is an explanatory view showing how the first, second and third lens groups are moved, and zooming and focusing operations are alternately performed subsequent to advancing/retracting operations of the variable focal length lens barrel in the embodiment of the present invention.

DESCRIPTION OF THE PREFERRED EMBODIMENTS

To start with, a configuration and an operation of a variable focal length lens barrel in embodiments of the present invention will hereinafter be outlined. Subsequently, details of components constituting the variable focal length lens barrel will be described, and then a zooming operation and a focusing operation of the variable focal length lens barrel will be explained in details.

Configuration of Variable Focal Length Lens Barrel

Figure 1:
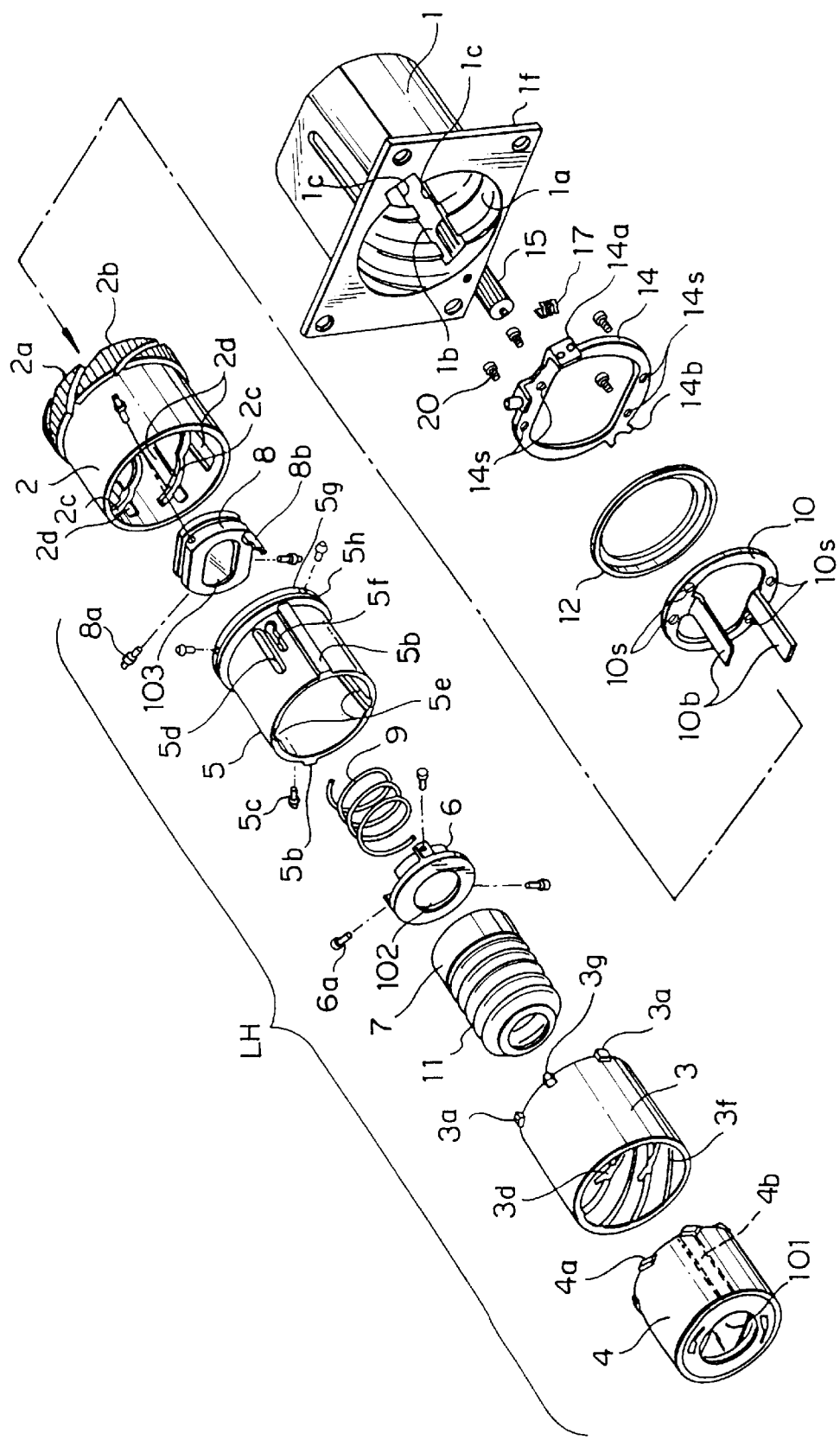
FIG. 1 is an explanatory view showing principal components of a variable focal length lens barrel in an embodiment of the present invention.
Figure 2:
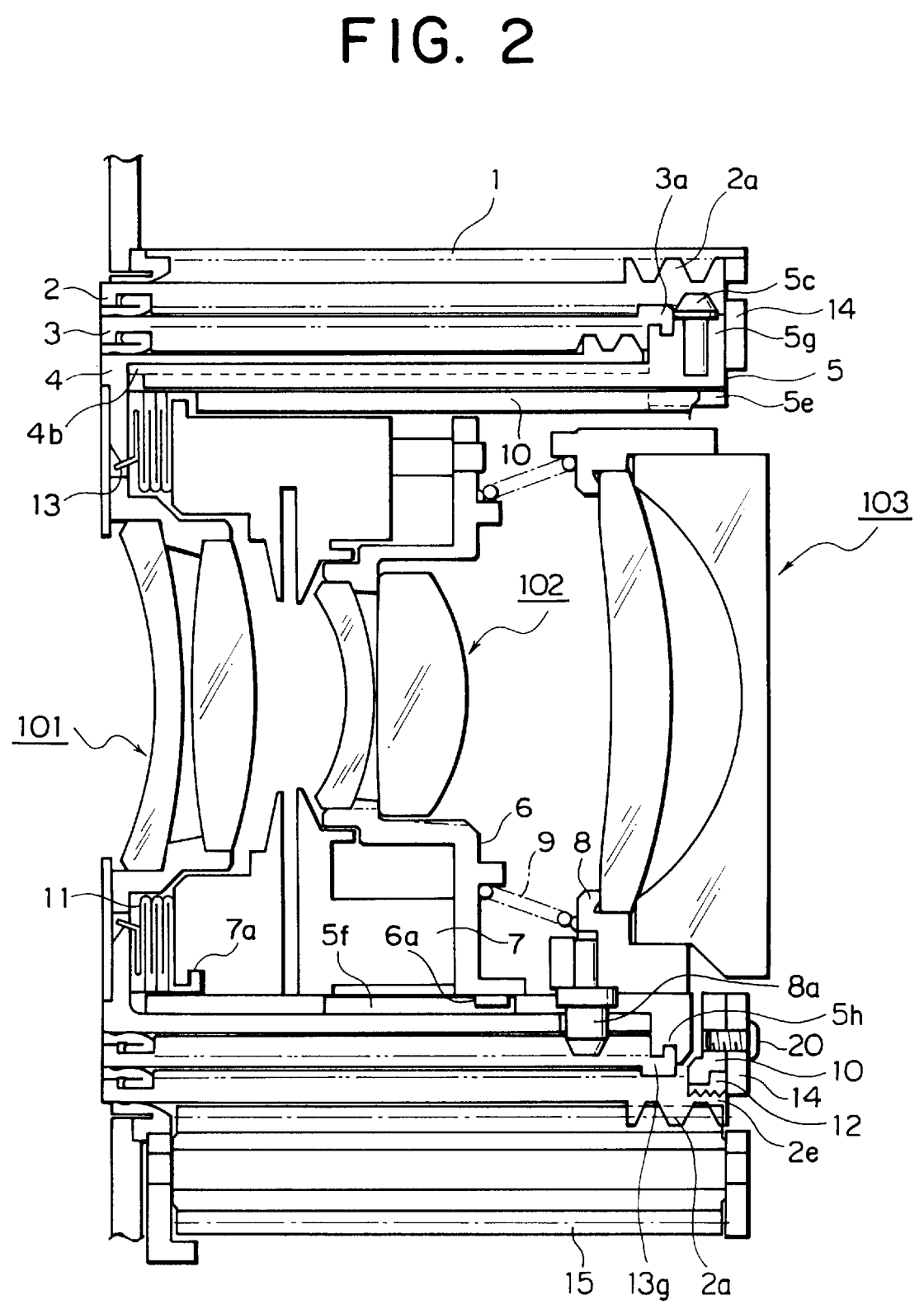

A discussion will be given referring to FIGS. 1 and 2. FIG. 1 is an exploded view showing main components of the variable focal length lens barrel in the embodiment of the present invention. FIG. 2 is a vertical sectional view taken along a photographing optical axis.

Referring first to FIG. 1, a flange member If is provided along a periphery of a fixed barrel 1, and the fixed barrel 1 is fixed to a camera body through the flange member 1f. A female helicoid thread 11a is formed in an internal periphery of the fixed barrel 1.

A male helicoid thread 2a meshing with the female helicoid thread 1a is formed on an outer peripheral surface of a first driving barrel 2, and a tooth space of a spur gear 2b meshing with a drive gear 15 is formed in a thread crest of the male helicoid thread 2a. That is, the male helicoid thread 2a incorporates both of a function of the helicoid thread and a function of the gear. An inner peripheral surface of the first driving barrel 2 is formed with three streaks of cam grooves 2c and six streaks of rectilinear advanced guide grooves 2d.

An outer peripheral surface of a second driving barrel 3 is provided with six pieces of protrusions 3a engaging with the six rectilinear advanced guide grooves 2d of the first driving barrel 2. An inner peripheral surface of the second driving barrel 3 is provided with a complex lead thread 3f which will hereinafter be explained in details, and further a cam groove 3d is so formed as to be overlapped with this complex lead thread 3f.

A first lens group 101 is fixedly assembled into a first lens group barrel 4 of which an outer peripheral surface is formed with six pieces of male helicoid threads 4a meshing with the six complex lead threads 3f of the second driving barrel 3. An inner peripheral surface of the first lens group barrel 4 is formed with two or three streaks of rectilinear advanced grooves 4b engaging with two or three pieces of protrusions 5b (FIG. 1 shows a case of providing two protrusions) formed extending in the direction of the optical axis on an outer peripheral surface of the rectilinear advanced guide barrel 5, whereby the first lens group barrel 4 and the rectilinear advanced guide barrel 5 are hindered from relatively moving in a direction around the optical axis and relatively movable in the direction of the optical axis.

A flange 5g formed with an circumferential groove 5h is provided in rear of the rectilinear advanced guide barrel 5. Three pieces of follower pins 5c are fixedly provided in positions which segment the circumference thereof equally by three. An inner peripheral surface of the rectilinear advanced guide barrel 5 is formed with two streaks of key grooves 5e engaging in a relatively movable manner in the optical axis direction with keys 10b of a movement key unit 10 which will be mentioned later on. A cylindrical portion of the rectilinear advanced guide barrel 5 has rectilinear advanced guide holes 5d and 5f formed by threes in the circumferential direction.

A second lens group frame 6 for holding a second lens group 102 is integrally fixed to a shutter unit 7 by threads (not shown). A groove 7a is, as shown in FIG. 2, formed anterior to the shutter unit 7. One end of a cylindrical bellows 11 composed of silicon rubber exhibiting a light shielding property and contractible and stretchable in the direction of the optical axis, is fixed to this groove 7a. The other end (an end on the object side) of the bellows 11 is, as shown in FIG. 2, fixed to a front end of the first lens group barrel 4 by a stop ring 13. The bellows 11 serves to prevent a light beam incident via the first lens group 101 from arriving at a film surface via an outer peripheral portion of the shutter unit 7.

As shown in FIG. 1, a third lens group frame 8 for holding a third lens group 103 and the second lens group frame 6 are incorporated into the rectilinear advanced guide barrel 5 with a biasing spring 9 being interposed therebetween. Three pieces of guide pins 6a inserted into the second lens group frame 6 engage with rectilinear advanced guide holes 5f. Three pieces of follower pins 8a inserted into the third lens group frame 8 engage with rectilinear guide holes 5d. The two lens group frames 6, 8 are thereby so held as to be movable in the optical axis direction within the rectilinear advanced guide barrel 5. In this case, the second lens group frame 6 is biased by the biasing spring 9 toward the object, and the third lens group frame 8 is biased toward the film side.

The first lens group barrel 4 and the second driving barrel 3 are assembled by meshing these barrels with each other. Further, as described above, the rectilinear advanced guide barrel 5 incorporating the second lens group frame 6, the biasing spring 9 and the third lens group frame 8, is assembled so that the protrusions 5b engage with the rectilinear advanced grooves 4b, thereby completing a lens holding unit LH. In this case, a protrusion 3g engaging with the circumferential groove 5h formed in the flange 5g is, as illustrated in FIGS. 2 and 4, formed on an inner periphery, in the vicinity of a film-side side end surface, of the second driving barrel 3, and the rectilinear advanced guide barrel 5 is incorporated into the second driving barrel 3, whereby the protrusion 3g engage with the circumferential groove 5h by snap fitting. The thus assembled second driving barrel 3 and rectilinear advanced guide barrel 5 integrally move in the optical axis direction and are relatively rotatable in a rotating direction about the optical axis. Then, when rotating the second driving barrel about the optical axis with the rectilinear advanced guide barrel 5 being fixed, the second driving barrel 3 relatively rotates about the first lens group barrel 4 of which a rotations is regulated by the rectilinear advanced guide barrel 5, and the first lens group barrel 4 rectilinearly moves in the optical axis direction by an action of the male helicoid thread 4a and of the complex lead thread 3f. At this time, the third lens group frame 8 rectilinearly moves within the rectilinear advanced guide barrel 5 by an action of the follower pin 8a inserted into the third lens group frame 8 and of the cam groove 3d of the second driving barrel 3.

Referring back to FIG. 1, the lens holding unit LH is incorporated into the first driving barrel 2, at which time the protrusion 3a engages with the guide groove 2d, and the follower pin 5c engages with the cam groove 2c. A female thread 2e is, as shown in FIG. 2, formed in an inner periphery, in the vicinity of the film-side side end surface, of the first driving barrel 2, and a fixed member 12 inserted into the movement key unit 10 meshes with this female thread 2e. This fixed member 12 enables the movement key unit 10 to relatively rotate with respect to the first driving barrel 2 without coming off the first driving barrel 2. Namely, the first driving barrel 2 and the movement key unit 10 integrally move in the optical axis direction and are relatively rotatable in the rotating direction about the optical axis. In a state where the movement key unit 10 is incorporated into the first driving barrel 2, the keys 10b of the movement key unit 10 engage with the key grooves 5e formed in the inner periphery of the rectilinear advanced guide barrel 5.

The male helicoid thread 2a formed in the outer peripheral surface of the first driving barrel 2 into which the lens holding unit LH and the movement key unit 10 are thus incorporated, is threaded into the female helicoid thread 1a of the fixed barrel 1, and further a guide frame 14 is fixed by four pieces of threads 20 to a side end, on the film-side, of the movement key unit 10. The guide frame 14 is provided with a protrusion 14b engaging with a peripheral edge 1c of an opening aperture 1b formed, extending in the optical axis direction, in the fixed barrel 1. With an engagement between the protrusion 14b and the peripheral edge 1c, the guide frame 14 is regulated in terms of its rotation about the optical axis and on the other hand movable in the optical axis direction.

A driving gear 15 is rotatably fitted in the opening aperture 1b described above, and a rotary shaft of the driving gear 15 extends in a direction parallel to the optical axis. The driving gear 15 meshes with the spur gear 2b cut in the male helicoid thread 2a of the first driving barrel 2 and thus rotates. With rotations of the driving gear 15, the first driving barrel 2 slides back and forth in the optical axis direction while rotating within the fixed barrell. The driving gear 15 has a tooth width enough to prevent a disengagement even when the first driving barrel 2 slides back and forth in the optical axis direction.

Outline of Operation of Variable Focal Length Lens Barrel

As described above, when the first driving barrel 2 slides back and forth in the optical axis direction while rotating within the fixed barrel 1, the guide groove 2d of the first driving barrel 2 engages with the protrusion 3a of the second driving barrel 3, and hence the second driving barrel 3 is moved round by the first driving barrel 2. On the other hand, the first lens group barrel 4 regulated in terms of it rotation about the optical axis by the rectilinear advanced guide barrel 5, the rectilinear advanced guide barrel 5 regulated in terms of it rotation about the optical axis by the movement key unit 10, and the movement key unit regulated in terms of it rotation about the optical axis by the guide frame 14, therefore rectilinearly move in the optical axis direction.

There will hereinafter be made discussion on optical axis directional moving operations of the first driving barrel 2, the third lens group frame 8, the fixed barrel5, the second lens group frame 6, the second driving barrel 3 and the first lens group barrel 4.

The first driving barrel 2 performs the back-and-forth sliding operation, of which a quantity is proportional to a rotational angle of the first driving barrel 2, with a lead set by the female helicoid thread 1a and the male helicoid thread 2a.

The rectilinear advanced guide barrel 5, with the follower pin 5c fixed to this rectilinear advanced guide barrel 5 engaging with cam groove 2c formed in the inner periphery of the first driving barrel 2, performs a back-and-forth movement of which a quantity corresponds a cam profile of the cam groove 2c and the rotational angle of the first driving barrel 2. Assuming a moving quantity in the optical axis direction on the basis of the film surface, the back-and-forth moving quantity of the rectilinear advanced guide barrel 5 is obtained by adding a lift quantity of the cam groove 2c to the sliding quantity of the first driving barrel.

The second driving barrel 3, as explained above, slides back and forth in the optical axis direction integrally with the rectilinear advanced guide barrel 5, and hence a sliding quantity thereof is the same as the moving quantity of the rectilinear advanced guide barrel 5.

The first lens group barrel 4, with a lead set by the complex lead thread 3f and the rectilinear advanced groove 4b, performs a back-and-forth movement of which a quantity corresponds to the rotational angle of the first driving barrel 2, i.e., a rotation of the second driving barrel 3. Assuming the moving quantity in the optical axis direction on the basis of the film surface, the back-and-forth moving quantity of the first lens group barrel 4 is a value given by adding an advanced quantity through the complex lead thread 3f to the moving quantity of the rectilinear advanced guide barrel 5.

Incidentally, the variable focal length lens barrel in this embodiment is classified as a so-called collapsible mount type variable focal length lens barrel. To be specific, the variable focal length lens barrel, upon switching ON a power source of the camera, advances to a wide end from a collapsed sate (stored state), and thereafter performs the advancing/retracting operations between the wide end and a telephoto end in accordance with an operation of a focal length changing switch by a photographer. In the following discussion in the present specification, an operation region of the variable focal length lens barrel which extends from the collapsed state to a position of the wide end, is referred to as a "collapsible region", and a region extending from the wide end to the telephoto end is called a "photographing region".

The second lens group frame 6 is, as described above, biased toward the object side by the biasing spring 9, and the guide pin 6a fixed to the second lens group frame 6 engages with the rectilinear advanced guide hole 5f of the rectilinear advanced guide barrel 5. When the variable focal length lens barrel is in the photographing region, the second lens group frame 6 moves integrally with the rectilinear advanced guide barrel 5. When the variable focal length lens barrel is, though it will be explained in greater details later on, in the collapsible region, for example, when retracted to the collapsed position from the wide end, the first lens group barrel 4 is retracted to such a position of being nested over the rectilinear advanced guide barrel 5. At this time, the shutter unit 7 is thrusted by the first lens group barrel 4, whereby the second lens group frame 6 moves back toward the film surface. Note that FIG. 2 illustrates how the second lens group frame 6 moves back toward the film surface side when the variable focal length lens barrel is in the collapsed state.

The follower pin 8a fixed to the third lens group frame 8, as explained above, penetrates the rectilinear advanced guide hole 5d of the rectilinear advanced guide barrel 5 and engages with the cam groove 3d formed in the inner peripheral surface of the second driving barrel 3. Therefore, the third lens group frame 8 performs the back-and-forth-movement of which a quantity corresponds to a rotational angle of the second driving barrel 3 when the same barrel 3 relatively rotates about the optical axis with respect to the rectilinear advanced guide barrel 5, and to a cam profile of the cam groove 3d. Assuming the moving quantity in the optical axis direction on the basis of the film surface, the back-and-forth moving quantity of the third lens group frame 8 is a value obtained by adding a lift quantity of the cam groove 3d to the moving quantity of the rectilinear advanced guide barrel 5.

To summarize the discussion, when the variable focal length lens barrel in this embodiment performs a zooming operation, only the first and second driving barrels 2, 3 effect the advancing/retracting operations while rotating about the optical axis. Other members such as the first lens group barrel 4, the second lens group frame 6, the rectilinear advanced guide barrel 5 and the third lens group frame 8 perform the advancing/retracting operations while not rotating, viz., make the rectilinear movements.

Herein, the operations of the first, second and third lens groups 101, 102, 103 will be explained by exemplifying a case where the variable focal length lens barrel performs the zooming operation from the wide end to the telephoto end. In the variable focal length lens barrel in accordance with this embodiment, the first, second and third lens groups 101, 102, 103 are held basically with the rectilinear advanced guide barrel 5 serving as a core thereof. Then, the rectilinear advanced guide barrel 5 is advanced by dint of action of the male helicoid thread 2a and the cam groove 2c of the first driving barrel 2. At this time, the firs lens group barrel 4 and the third lens group frame 8 each make the relative movements with respect to the rectilinear advanced guide barrel 5 by the action of the complex lead thread 3f and of the cam groove 3d which are formed in the inner surface of the second driving barrel 3. The second lens group frame 6 moves integrally with the rectilinear advanced guide barrel 5. With a combination of the operations described above, the first, second and third lens groups 101, 102 and 103 move toward the object in synchronization with the zooming operation of the variable focal length lens barrel, and in the meantime inter lens group spacings between the first and second lens groups 101, 102 and between the second and third lens groups 102, 103, are changed.

Subsequent to the above discussions on the configuration and the outline of the operation of the variable focal length lens barrel in this embodiment of the present invention, the main components constituting the variable focal length lens barrel will be explained in details.

First Driving Barrel

FIG. 3A shows in development the inner peripheral surface of the first driving barrel 2, wherein an upper part in FIG. 3A corresponds to the object side, while a lower part therein corresponds to the film surface side. The inner peripheral surface of the first driving barrel 2 is formed with six streaks of guide grooves 2d engaging with the protrusions 3a of the second driving barrel 3, and with three streaks of cam grooves 2c engaging with the follower pins 5c fixed to the rectilinear advanced guide barrel 5.

The first driving barrel 2 is formed by molding of plastics etc, and the cam groove 2c is tapered in width to expand toward the center of the first driving barrel 2. With this taper, there is prevented an undercut (which is interference caused between a die assembly and a product when removing the product out of the die assembly) when molding the second driving barrel 3.

FIGS. 3B and 3C are sectional views taken along the line B—B on FIG. 3A. The reason why the number of the guide grooves 2d provided is twice as large as the number of the cam grooves 2c will be explained referring to FIGS. 3B and 3C. The cam groove 2c is formed deeper than a depth of the guide groove 2d, and hence the guide grooves 2d are each separated at points of just intersecting the guide grooves 2c. An engagement quantity in the optical axis direction, with which the protrusion 3a engages with the guide groove 2d, is smaller than a value of the width of the cam grove 2c. Therefore, as shown in FIG. 3B, the protrusion 3a engaging with the guide groove 2d moves in an upper direction in FIG. 3 with the advancement of the second driving barrel 3, and, as shown in FIG. 3C, just when reaching the area of being separated by the cam groove 2c, disengages from the guide groove 2d. If there are provided the same number of the guide grooves 2d as the number of the cam grooves 2c, and if these cam grooves 2c and guide grooves 2d are disposed at equal intervals, the protrusions 3a disengage from the guide grooves 2d at the same time.

Such being the case, in the variable focal length lens barrel in this embodiment, three streaks of cam grooves 2c are formed, and by contrast there are formed a 2-fold number of, i.e., six streaks of guide grooves 2d. With the contrivance that there are provided the guide grooves 2d of which the number is twice as large as the number of the cam grooves 2c, even if the protrusion 3a disengages from, e.g., an odd-numbered guide groove 2d counted from the left in FIG. 3A but remains engaged with an even-numbered guide groove 2d. As for the positions for disposing the guide groves 2d, the guide grooves 2d are not necessarily disposed in such positions as to segment the circumference equally by 6 but may be, as shown in FIG. 3A, disposed at unequal pitches. In short, the disposing pitch of the guide grooves 2d may be determined so that the protrusion engages with any one of the guide grooves 2d and that all the plurality of protrusions 3a do not simultaneously disengage therefrom.

In this embodiment, three streaks of odd-numbered guide grooves 2d counted from the left in FIG. 3A, and three streaks of even-numbered guide grooves counted the same, are provided in such positions as to segment the circumference substantially equally by 3. Namely, circumferential pitches at which the guide grooves 2d are disposed, are repeated such as P1, P2, P1, P2, . . . The guide grooves are thus disposed, and, if the protrusion 3a disengages from the even-numbered guide grooves 2d but remains engaged with the odd-numbered guide grooves 2d. In addition, the first and second driving barrels engage with each other at all times in positions for segmenting the circumference substantially equally by 3, and an excellent support balance is given. Owing to a geometry thus exhibiting the excellent support balance, the first and second driving barrels can be relatively moved in smoothness.

In contrast with the example given above, the number of the guide grooves formed together with the three cam grooves 2c is set to "3", and, for instance, the guide grooves 2d may be disposed at unequal intervals, thereby making it feasible to prevent all the protrusions 3a (three pieces of protrusions 3a in this case) from being disengaged at the same time. Alternatively, it is also possible to provide, for example, four streaks of guide grooves 2d for the three cam grooves 2c, whereby all the protrusions 3a can be also prevented from disengaging simultaneously. If this configuration is taken, however, when the protrusion 3a disengages from the guide groove 2d somewhere, the position in which the first driving barrel 2 engages with the second driving barrel 3 might deviate on the circumference, with the result that the support balance might be lost. Accordingly, there are provided the guide grooves 2d of which the number is a multiple of integer of the number of the cam grooves 2c disposed, and in addition it is desirable that the positions in which to dispose the guide grooves 2d be set so that the protrusions 3a remain engaged with the guide grooves 2d in positions for segmenting the circumference substantially equally by 3 at all times.

Note that there has been exemplified the case where the number of the cam grooves 2c disposed is set to "3" and may be set to two or other numerical values.

Incidentally, the contrivance in design is not needed by setting the optical axis directional length of each of the plurality of protrusions 3a larger than the groove width of the cam groove 2c. A minimum dimension of the first driving barrel 2 in the optical axis direction is determined by a sum of the relative slide stroke in the optical axis direction between the first and second driving barrels 2, 3 and of the optical axis directional length of the protrusion 3a, and hence the optical axis directional length of the first driving barrel 2 also increases when the optical axis directional length of the protrusion 3a increases. Therefore, as explained above, it is effective in reducing an entire length of the variable focal length lens barrel when collapsed to decrease the optical axis directional length of the protrusion 3a, and it is desirable that the contrivance in design be given.

Second Driving Barrel

The complex lead thread 3f and the cam groove 3d, which are formed in the inner peripheral surface of the second driving barrel 3, will be explained referring to FIGS. 4A and 4B. FIGS. 4A and 4B illustrate in development the inner peripheral surface of the second driving barrel 3, wherein an upper part in the Figures corresponds to the object side, while a lower part therein corresponds to the film side. Complex lead threads 3f1–3f6 are constructed such that threads provided in a range A, positioned on the film side shown in FIG. 4, of the second driving barrel 3 and each having a first lead, are connected via bending portions 3e1–3e6 to threads 3c1–3c6 provided in a range B. positioned on the object side, of the second driving barrel 3 and each having a second lead.

In the following discussion in the present specification, the threads having the first and second leads are simply referred to as a "first lead thread" and a "second lead thread". As known from FIG. 4, the complex lead threads 3f1–3f6 are categorized as multi-streak thread having six streaks in this embodiment.

To explain a configuration of the complex lead threads 3f1–3f6, among the first lead threads 3b1–3b6 constituting six pieces of complex lead threads 3f1–3f6, the threads with odd-numbered suffix numerals are different in terms of their groove widths of thread roots from those of the threads with even-numbered suffix numerals. More specifically, the thread roots of the first lead threads 3d1, 3d3, 3d5 are formed having larger groove widths than those of the threads 3d2, 3d4, 3d6. The reason why so will be elucidated later on.

On the film side, i.e., on the side of the range A of the complex lead threads 3f1–3f6, the three cam grooves 3d1–3d3 assuming the same configuration are provided in the positions for segmenting the circumference substantially equally by 3 so as to be overlapped with the complex lead threads 3f1–3f6.

As illustrated in FIG. 4B showing the section taken along the line II—II in FIG. 4A, the cam grooves 3d1–3d3 are so formed as to have a depth (dimension b) larger than a depth (dimension a) of the thread root of each of the complex lead threads 3f1–3f6. Note that as in the case of the first driving barrel 2, the second driving barrel 3 is formed by molding of plastics etc., and the thread roots of the complex lead threads 3f1–3f6 and the cam grooves 3d1–3d3 are tapered in their groove widths to expand toward the center of the second driving barrel 3. With this taper, there is prevented an undercut when molding the second driving barrel 3.

Six streaks of male helicoid threads 4a1–4a6 provided on the outer periphery of the first lens group barrel 4 and meshing with the complex lead threads 3f1–3f6, will be described referring to FIGS. 5A and 5B. FIG. 5A shows in development the inner peripheral surface of the second driving barrel 3, wherein thread crests of two streaks of male helicoid threads 4a1, 4a2 among the six threads are overlapped with each other. The following discussion will be made by exemplifying how the complex lead thread 3f1 meshes with the male helicoid thread 4a1. Note that illustrations of the cam grooves 3d1, 3d2 are omitted in order to avoid a complication of lines on the left side of the two-dotted chain line AA in FIG. 5A.

FIG. 5B is an enlarged view of the male helicoid thread 4a1. Referring to FIG. 5B, the male helicoid thread 4a1 has first lead surfaces a, b meshing with the first lead thread 3b1, second lead surfaces c, d meshing with the second lead thread 3c1, and surface e, f orthogonal to the optical axis. Note that the male helicoid threads 4a1–4a6 are respectively tapered corresponding to the tapers formed in the complex lead threads 3f1–3f6, and each take a thread crest shape such as a so-called trapezoidal thread shape, of which an illustration is, however, omitted.

Referring back to FIG. 5A, the male helicoid thread 4a1 meshes the first lead thread 3b1 in the collapsible region extending from the collapsed position to the vicinity of the wide end, and meshes with the second lead thread 3c1 in the photographing region from the wide end to the telephoto end.

With the reference to FIG. 5C, there will be described a process of a changeover from a state where the male helicoid thread 4a1 meshes with the first lead thread 3b1 to a state of meshing with the second lead thread 3c1, or reversely from the state of meshing with the second lead thread 3c1 to the state of meshing with the first lead thread 3b1. FIG. 5C is a partially enlarged view showing the first lead thread 3b1, the bending portion 3e1 and the second lead thread 3c1 together with the male helicoid thread 4a1. The variable focal length lens barrel advances from the collapsed position to the wide end, in which process the second driving barrel 3 moves leftward in the Figure. The male helicoid thread 4a1 is thrust by an inclined surface p of the first lead thread 3b1 and thereby moves upward (toward the object side) in the Figure. In the process of the variable focal length lens barrel retracting to the collapsed position from the wide end, the second driving barrel 3 moves rightward in the Figure. The male helicoid thread 4a1 is thrust by an inclined surface q of the second lead thread 3c1 and thereby moves downward (toward the film side) in the Figure. In both of cases, the male helicoid thread 4a1 is changed over by the bending portion 3e1 from the state of meshing with the first lead thread 3b1 to the state of meshing with the second lead thread 3c1, or alternatively from the state of meshing with the second lead thread 3c2 to the state of meshing with the first lead thread 3b1.

Note that the thread roots of the first lead threads 3b1, 3b3, 3b5 are, as described above, are formed larger in their groove widths than the thread roots of the threads 3b2, 3b4, 3b6. Accordingly, for example, the dimension of the male helicoid thread 4a2 is different from that of the male helicoid thread 4a1 but similar in terms of its configuration to the male helicoid thread 4a1, and therefore neither the illustration nor the explanation is given herein.

The reason why among the six complex lead threads 3f1–3f6, the threads with the odd-numbered suffix numerals have the different groove widths of the thread roots thereof from those of the threads with the even-numbered suffix numerals will be explained referring again to FIGS. 4A and 4B. Normally the complex lead threads 3f1–3f6 and the cam grooves 3b1–3b3 are not provided in overlap, and it might be simpler in terms of structure that the optical axis directional dimension of, e.g., the second driving barrel 3 is elongated, and the complex lead threads 3f1–3f6 and the cal grooves 3b1–3b3 are provided separately in the front and rear directions along the optical axis. If the optical axis directional dimension of the second driving barrel 3 is thus elongated, however, it follows that the variable focal length lens barrel also elongates, with the result that the a thickness of the camera when collapsed can not be decreased. Therefore, as shown in FIGS. 4A and 4B, the complex lead threads 3f1–3f6 and the cam grooves 3b1–3b3 are provided in overlap.

As discussed above, when the complex lead threads 3f1–3f6 and the cam grooves 3b1–3b3 are provided in overlap, as shown in FIG. 4A, the thread grooves of the complex lead threads 3f1–3f6 are separated by the cam grooves 3b1–3b3. Hence, there might be a possibility in which the male helicoid crews 4a1–4a6 disengage from the complex lead threads 3f1–3f6 at the same time for the same reason as what has been explained about the first driving barrel 2 (FIGS. 3A–3C). The three streaks of the cam grooves 3b1–3b3 are formed so as not to cause the inconvenience described above, and by contrast there are provided the complex lead threads 3f1–3f6 of which the number is the multiple of integer thereof, i.e., twice the number of the cam grooves, viz., the six pieces of threads are provided.

Incidentally, if the cam profile of the cam grooves 3d1–3d3 is sinuous as seen in the present embodiment, one single complex lead thread is separated at a plurality of points depending on the cam profile, and there might be such a possibility that the male helicoid threads 4a1–4a6 disengage from the complex lead threads 3f1–3f6 simultaneously. In such a case, it is effective to make the groove widths of the thread roots of the threads with the odd-numbered suffix numerals different from those of the threads with the even-numbered suffix numerals, among the six pieces of complex lead threads 3f1–3f6. That is, with the change in the groove widths of the thread roots, it is feasible to shift the position in the optical axis direction when the complex lead threads 3f1–3f6 are separated by the cam grooves 3b1–3b3, and hence it is possible to design such a geometry that the male helicoid threads 4a1–4a6 disengage from the complex lead threads 3f1–3f6 at the same time.

There has already been described the operation that the male helicoid threads 4a1–4a6 pass through the bending portions 3e1–3e6 of the complex lead threads 3f1–3f6 when the variable foal length lens barrel in this embodiment performs the advancing/retracting operations from the collapsible region to the photographing region or alternatively from the photographing region to the collapsible region. Namely, when the engagements of the male helicoid threads 4a1–4a6 are switched over between the first lead threads 3b1–3b3 and the second lead threads 3c1–3c6, the bending portions 3e1–3e6 perform a significant function. To be more specific, the male helicoid threads 4a1–4a6 pass through the bending portions 3e1–3e6, just at which time the operations of the male helicoid threads 4a1–4a6 largely change over, and it is therefore of much importance that the bending portions 3e1–3e6 are not separated by the cam grooves 3b1–3b3.

When determining the configuration of the complex lead threads 3f1–3f6 in order that the bending portions 3e1–3e6 are not separated by the cam grooves 3b1–3b4, as discussed above, it may suffice to take into consideration parameters such as the number of streaks of the threads and the widths of the thread grooves.

In consideration of the parameters explained above, in accordance with this embodiment, as shown in FIG. 4, the contrivance is that all the bending portions 3e1–3e6 of the six pieces of complex lead threads 3f1–3f6 are not separated by the cam grooves 3d1–3d3. In theory, if even one of the six bending portions 3e1–3e6 is left intact, the male helcoid threads 4a1–4a6 must operate. In fact, however, there might exist factors of instability such as a manufacturing error of the second driving barrel 3, and a fitting backlash between the second driving barrel 3 and the male helicoid threads 4a1–4a6 of the first lens group barrel 4. It might happen that any one of the male helicoid threads 4a1–4a6 on the verge of passing through the separated bending portion disengages from the thread groove due to these factors of instability. Accordingly, it is desirable in terms of a certainty of the operation and of smoothing the operation as well that all the bending portions 3e1–3e6 are not separated by the cam grooves 3d1–3d3.

Given herein is an explanation about positions in which the complex lead threads 3f1–3f6 and the cam grooves 3d1–3d3 are formed in the inner peripheral surface of the second driving barrel 3. As compared with positions of forming the complex lead threads 3f1–3f6 for advancing and retracting the first lens group barrel 4, positions for forming the cam grooves 3d1–3d3 for moving the third lens group frame 8 are on the film surface side as shown in FIG. 3. The reason why the complex lead threads 3f1–3f6 and the cam grooves 3d1–3d3 are formed in the above-described positional relationship, is to enhance a strength of the variable focal length lens barrel. That is, when an external force acts on the first lens group barrel 4 and the third lens group frame 8 in the optical axis direction, a shearing stress is produced in each of the male helicoid threads 4a1–4a6, the complex lead threads 3f1–3f6, the follower pins 8a and the cam grooves 3d1–3d3. Supposing that the same external force acts in the optical axis direction at that time, the shearing stress produced in the male helicoid threads 4a1–4a6 and the complex lead threads 3f1–3f6 of which the quantity of engagement is comparatively large, is smaller than the shearing stress produced in the cam grooves 3d1–3d3.

Namely, the male helicoid threads 4a1–4a6 and the complex lead threads 3f1–3f6 are durable against a larger external force.

Therefore, in the variable focal length lens barrel in this embodiment, the first lens group barrel 4 exposed to the outside of the lens barrel engages with the second driving barrel 3 through the helicoid threads, and on the other hand the third lens group frame 8 having a less possibility of receiving the external force because of being disposed within the lens barrel on the film surface side, is moved by the cam.

The positions of forming the complex lead threads 3f1–3f6 and the cam grooves 3d1–3d3 in the internal surface of the second driving barrel 3, are set as described above, thereby making it feasible to enhance the strength of the members constituting the lens barrel, which are exposed to the outside. Then, the complex lead threads 3f1–3f6 and the cam grooves 3d1–3d3 are provided in overlap in the optical axis direction, whereby the entire length of the second driving barrel 3 can be reduced. Downsizing of the camera can be thereby attained by decreasing the dimensions of the variable focal length lens barrel when collapsed.

Rectilinear Advanced Guide Barrel and Constricted Portion of Shutter FPC

Figure 6:
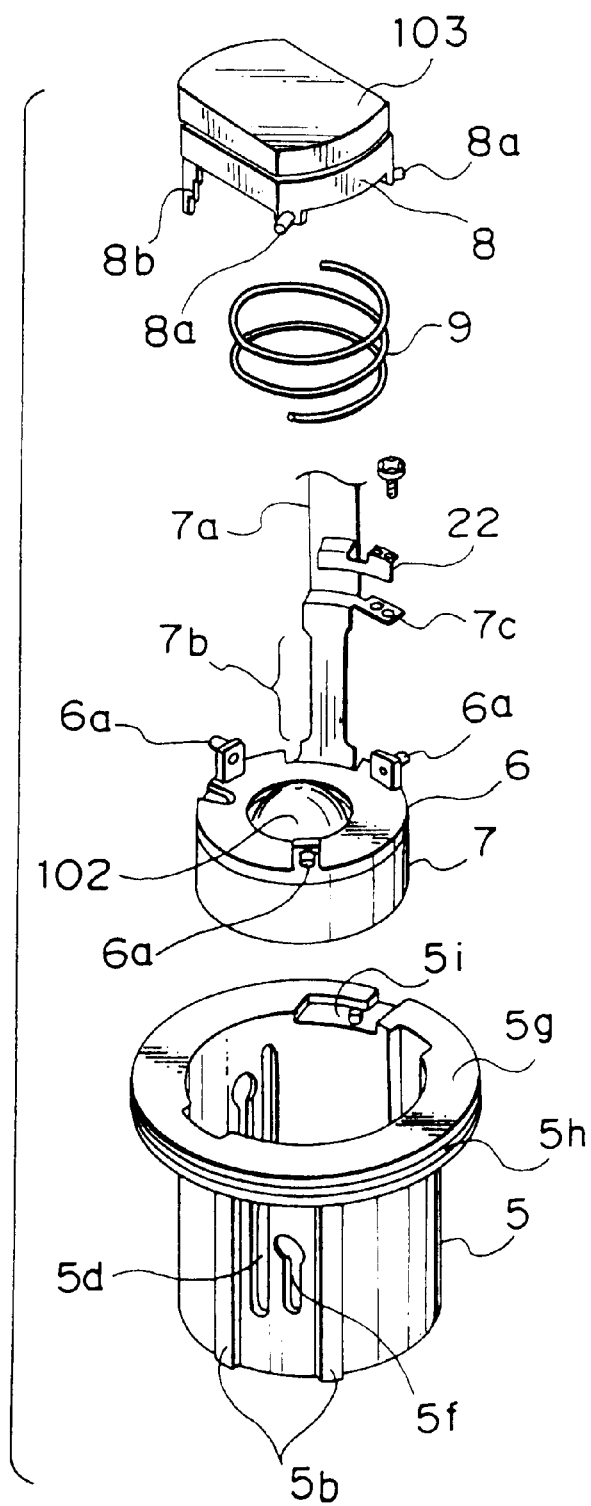
FIG. 6 is a view showing how a shutter unit, a second lens group frame, a biasing spring and a third lens group are assembled into a rectilinear advanced guide barrel.

FIG. 6 shows how the assembled second lens group frame 6 of the shutter unit 7, the biasing spring 9 and the third lens group frame 8 are incorporated into the rectilinear advanced guide barrel 5. An intermediate member 7c of a shutter FPC 7a for electrically connecting the shutter unit 7 to a circuit board (unillustrated) of the camera body, is fixed via an FPC stopper 22 to a notch 5i formed in the flange 5g.

As previously explained, the rectilinear advanced guide barrel 5 is formed with the rectilinear advanced guide holes 5d, 5f. The second lens group frame 6 with the guide pin 6a engaging with the rectilinear advanced guide hole 5f, and the third lens group frame 8 with the follower pins 8a engaging with the rectilinear advanced guide hole 5d, are so supported as to be movable in the optical axis direction within the rectilinear advanced guide barrel 5. Then, by the biasing spring 9 interposed between the second lens group frame 6 and the third lens group frame 8, the second lens group frame 6 is biased downward (toward the object side) in the Figure, while the third lens frame 8 is biased upward (toward the film surface side) in the Figure. A plurality of protrusions 5b are provided, extending in a direction parallel to the optical axis, along the outer periphery of the rectilinear advanced guide barrel 5, and, as shown in FIG. 1, engage with the rectilinear advanced grooves 4b formed inside the first lens group barrel 4. That is, the rectilinear advanced guide barrel 5 functions as a movable frame for holding the first lens group barrel 4 (for the first lens group 101), the second lens group frame 6 (for the second lens group 102) and the third lens group frame 8 (for the third lens group 103), and also functions as a rectilinear advanced guide for the first lens group barrel 4 and the third lens group frame 8.

The shutter FPC 7a is formed with a constricted portion 7b of which a width is partially narrowed. A plurality of conduction patterns are formed in the longitudinal direction of the shutter FPC 7a and are also narrowed in their pattern widths at the above constricted portion 7b. This, as will hereinafter be explained, intends to decrease a thicknesswise flexural rigidity of the constricted portion 7b.

Figure 7:
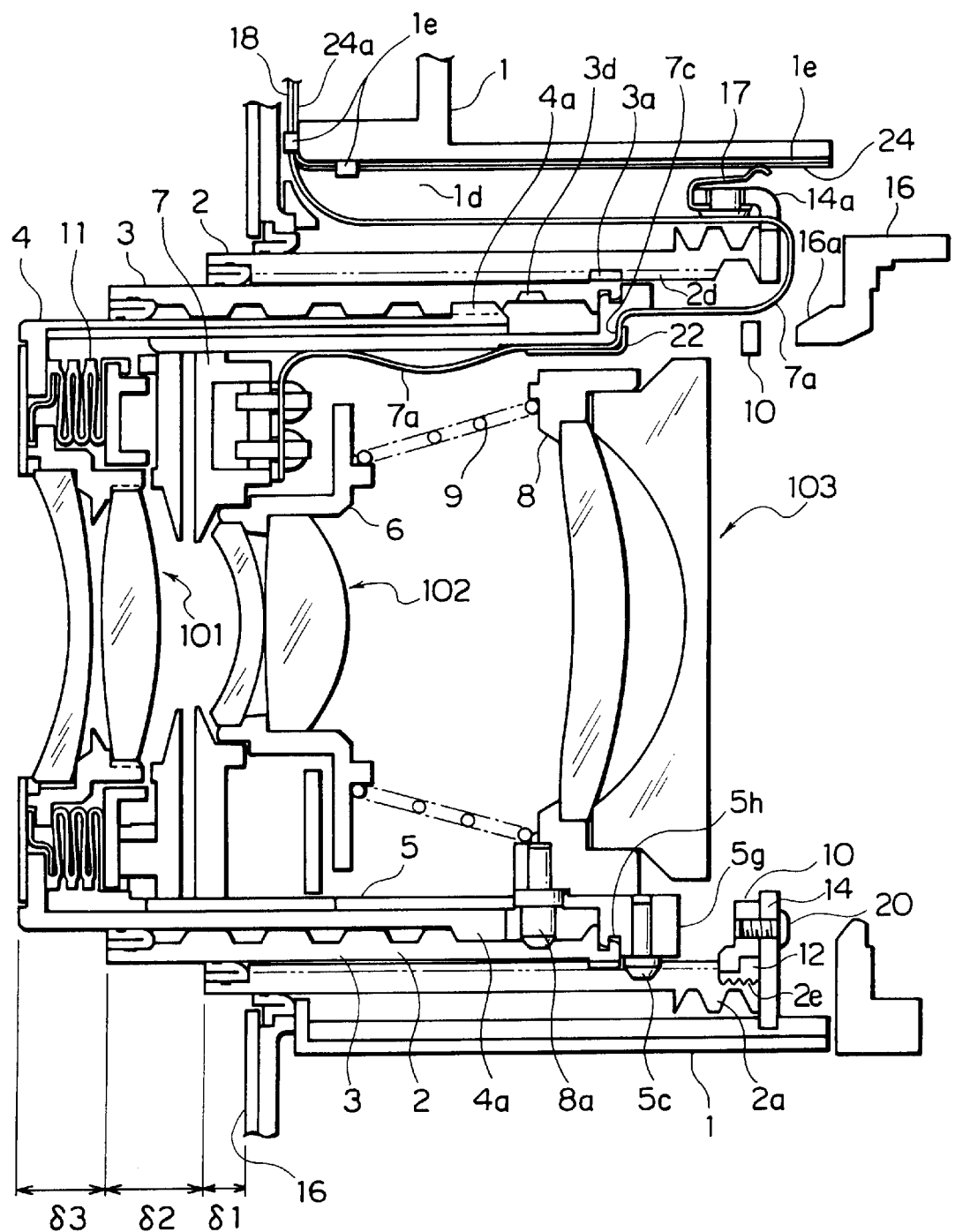
FIG. 7 is a vertical sectional view showing a state where the variable focal length lens barrel in this embodiment of the present invention is at a wide end.

FIG. 7 is a vertical sectional view showing a state where the variable focal length lens barrel in this embodiment is positioned at the wide end. Referring to FIG. 7, the second lens group frame 6 is biased leftward (toward the object side) in the Figure. That is, the second lens group frame 6 and the shutter unit 7 are in a state of being thrust most toward the object side within the movable range of the rectilinear advanced guide barrel 5. When the variable focal length lens barrel is positioned in the photographing region from the wide end to the telephoto end, the positional relationship between the rectilinear advanced guide barrel 5, the second lens group barrel 6 and the shutter unit 7, is kept in the state shown in FIG. 7. In this state, the shutter unit 7 is at the greatest distance from the flange 5g of the rectilinear advanced guide barrel 5, and therefore the shutter FPC 7a has a comparatively small quantity of sagging.

Figure 8:
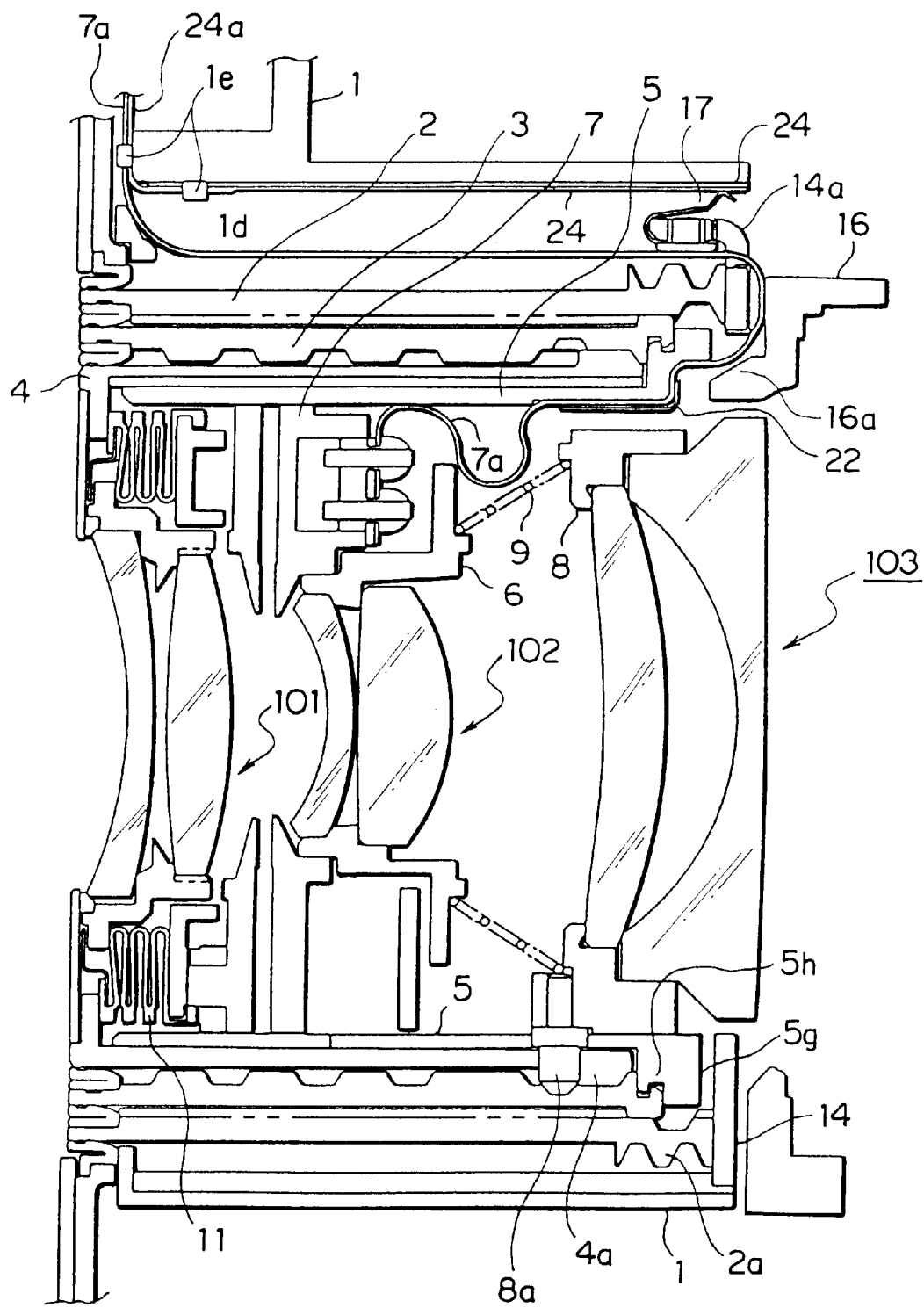
FIG. 8 is a vertical sectional view showing a state where the variable focal length lens barrel in this embodiment of the present invention is in a collapsed position.

FIG. 8 is a vertical sectional view showing a state where the variable focal length lens barrel in this embodiment is in the collapsed position. In the collapsed position, the first lens groupbarrel4retracts to such a position as to overlap with the rectilinear advanced guide barrel 5 in the optical axis direction, and the first lens group barrel 4 that retracts thrusts the second lens group frame 6 toward the film surface side, thus retracting the second lens group frame 6. With the retraction of the second lens group frame 6, the shutter unit 7 moves close to the flange 5g of the rectilinear advanced guide barrel 5, with the result that the quantity of sagging of the shutter FPC 7a increases.

Incidentally, when the camera is not used, the variable focal length lens barrel is in the collapsed state in the great majority of cases. That is, the shutter FPC 7a is in the state shown in FIG. 8 in many cases. Therefore, the shutter FPC 7a is easy to have a tendency of being bent. If the bending tendency is given to the shutter FPC 7a, the bending tendency of the shutter FPC 7a acts as an elastic force of retracting the second lens group frame 6 when the variable focal length lens barrel is advanced to the photographing region. If the force by which the biasing spring 9 thrusts the second lens group frame 6 out towards the object side exceeds the elastic force, the second lens group frame 6 is titled with respect to the optical axis, or there changes a lens group interval between the second lens group 103 and the third lens group 103, thereby causing a decline of an optical performance. By contrast, in the variable focal length lens barrel in this embodiment, the constricted portion 7b (FIG. 6) described above is positioned at the bending portion of the shutter FPC 7a. Accordingly, the flexural rigidity of the shutter FPC 7a decreases, whereby the inconvenience given above can be prevented. As a matter of course, it is feasible to restrain the inconvenience by increasing the biasing force of the biasing spring 9, however, if the biasing force of the biasing spring 9 is increased, there might rise a load of the motor for driving the variable focal length lens barrel to perform its zooming. Hence, it is desirable that the rigidity of the shutter FPC 7a be decreased.

Note that a length of the constricted portion 7b is a slight value as compared with the entire length of the shutter FPC 7a, and an increase quantity of a conductive resistance due to the reduction in the conduction pattern width at the constricted portion 7b, can be made smaller than in the case of reducing the conduction pattern width over the entire length of the shutter FPC 7a. Hence, there is not restricted a supply of the electric current to the shutter actuator requiring a comparatively large driving current, and it is possible to obtain a sufficient driving force of the shutter actuator.

Fixed Barrel

Figure 9A:
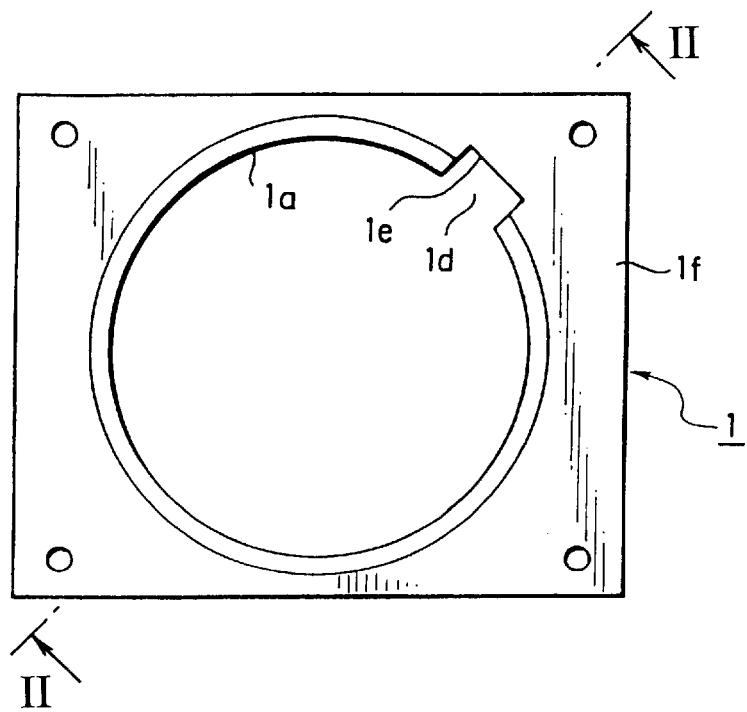
FIGS. 9A and 9B are explanatory views showing a configuration of a fixed barrel.
Figure 9B:
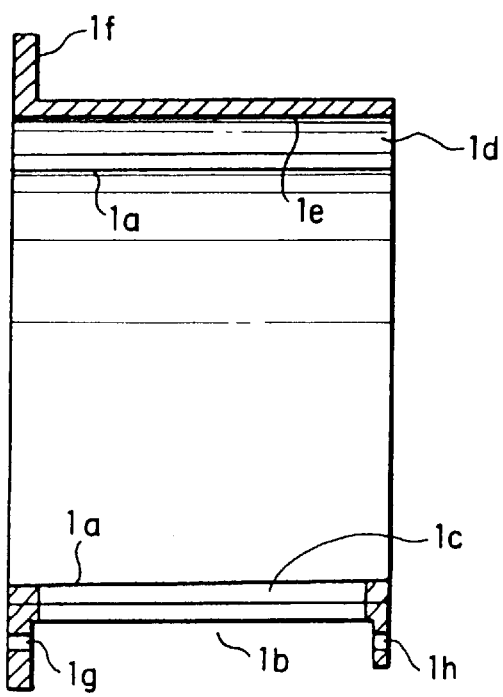

FIG. 9A is a front view showing how the fixed barrel 1 appears as viewed from the object side. FIG. 9B is a sectional view taken along the line II—II in FIG. 9A. As illustrated in FIG. 9A, a notched groove 1d is formed in a part of the female helicoid thread 1a formed in the inner surface of the cylindrical member of the fixed barrel 1. A deeper surface 1e of this groove 1d is provided in such a position as to be spaced farther away from the optical axis than a root diameter of the female helicoid thread 1a. The groove 1d, as shown in FIG. 9B, extends in the optical axis direction and, as will be explained later on, serves as a space for disposing a so-called encoder substrate for electrically detecting an optical axis directional advancing position of the variable focal length lens barrel and the shutter FPC 7a as well. The groove 1d also, as will be mentioned later on, serves as a moving space for an encoder brush which slides in the optical axis direction on the surface of the encoder substrate.

An opening aperture 1b is holed substantially in a face-to-face position to the groove 1d with respect to the cylindrical member of the fixed barrel 1. Shafts provided at both side ends of the driving gear 15 for rotationally driving the first driving barrel 2, are rotatably supported in holes 1g, 1h of the fixed barrel 1. Then, as previously explained above, the driving gear 15 meshes via the opening aperture 1b with the gear 2b cut in the male helicoid thread 2a of the first driving barrel 2.

Referring again to FIG. 8, a configuration peripheral to the groove 1d of the fixed barrel 1 will be described. An encoder substrate 24 is disposed extending from the deeper surface 1e of the groove 1d. A pattern formed on the encoder substrate 24 may be what generates a 1-bit signal simply repeating ON/OFF states, or may be a so-called 2-phase clock signal-like pattern obtained by further adding to the above pattern a pattern of which an ON/OFF phase is shifted 180 degrees. The driving gear 15 (FIG. 2) is driven by an unillustrated motor, and the first driving barrel 2 moves back and forth in the optical axis direction. Thereupon, an encoder brush 17 fixed to an encoder brush fitting member 14a of a guide frame 14 moves and slides in the optical axis direction on the encoder substrate 24. A signal generated corresponding to the movement of the encoder brush 17 in the optical axis direction, is inputted to an unillustrated control circuit. This signal is used for detecting the advancing position of the variable focal length lens barrel, or for obtaining a piece of focal length data and a piece of open F-value data.

An FPC 24a connected to the encoder substrate 24 is fixed to the fixed barrel 1 by use of fixing member 1e together with the shutter FPC 7a. The shutter FPC 7a is so disposed as to be positioned in a space between the encoder brush 17 and the first driving barrel 2 in the groove 1d.

Figure 10:
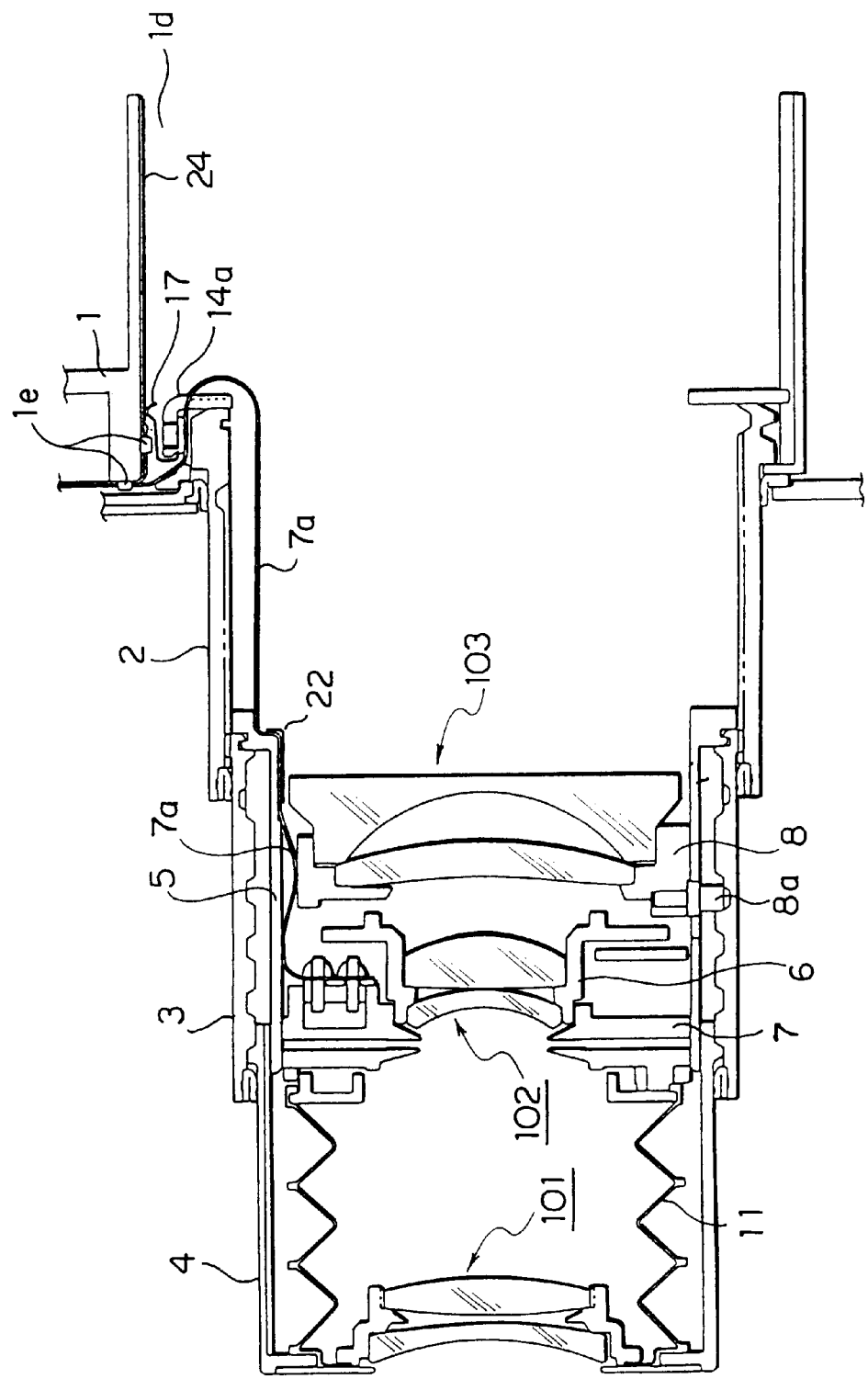
FIG. 10 is a vertical sectional view showing a state where the variable focal length lens barrel in this embodiment of the present invention is at a telephoto end.

An operation of the shutter FPC 7a subsequent to the zooming operation of the variable focal length lens barrel in this embodiment, will be explained with reference to FIGS. 7 and 10. FIG. 7 shows a case where the variable focal length lens barrel is at the wide end, wherein the rectilinear advanced guide barrel 5 is in a position comparatively proximal to the film surface. A large proportion of a span between the FPC stopper 22 of the shutter FPC 7a and the fixing member 1e, is accommodated in the groove 1d. As the variable focal length lens barrel is advanced toward the telephoto side as shown in FIG. 10, the second driving barrel 3 (the rectilinear advanced guide barrel 5) and the first driving barrel 2 are advanced toward the object side. With these advancements, the shutter FPC 7a accommodated in the groove 1d moves into the lens barrel. At this time, the shutter FPC 7a moves between the first driving barrel 2 and the encoder brush 17 within the groove 1d. To be more specific, if the shutter FPC 7a becomes sinuous in the groove 1d and comes into contact with the encoder substrate 24, the shutter FPC 7a is thrust back by the encoder brush fitting member 14a of the guide frame 14, whereby a contact between the encoder brush 17 and the encoder substrate 24 is never hindered.

The groove 1d described above is formed, so to speak, in a box-like configuration outwardly of the root diameter of the female helicoid thread 1a of the fixed barrel 1, and does not therefore separate the cylindrical member of the fixed barrel 1. Hence, it is feasible to restrain a decline of the rigidity of the cylindrical member to a greater degree than in the case of forming the opening aperture by notching the cylindrical member of the fixed barrel 1. Further, the groove 1b is not opened but closed, thereby restraining the light beam traveling out of the third lens group 103 upon an open of the shutter unit 7 when in the photographing operation, from leaking outside the fixed barrel 1 and reaching on the film surface.

Moreover, a distance of the deeper surface 1e of the groove 1d from the optical axis is determined by a parts manufacturing accuracy of the fixed barrel 1, and accordingly there is reduced a scatter in the dimensional error from the optical axis to the slide surface on the encoder substrate 24. Therefore, a contact pressure of the encoder brush 17 upon the encoder substrate 24 can be stabilized, and a reliability can be enhanced. Further, a degree of integration as a unit of the variable focal length lens barrel can be increased, and it is feasible to facilitate an inspection of the operation at a unit-stage and to reduce the number of final assembling processes of the camera incorporating the variable focal length lens barrel. By contrast, the fixed barrel 1 is formed with an opening aperture, the encoder substrate 24 is fixed to the body, and the encoder brush 17 comes into contact with the encoder substrate 24 through this opening aperture. In this case, the contact pressure of the encoder brush 17 might be easy to scatter due to a scatter in terms of a fitting position of the fixed barrel 1 to the body. Moreover, the signal outputted from the encoder substrate 24 can not be inspected before incorporating the variable focal length lens barrel into the body.

Incidentally, the groove 1d is, as explained above, provided outwardly of the root diameter of the female helicoid thread 1a of the fixed barrel 1, and hence an outer peripheral portion of the cylindrical member of the fixed barrel 1 comes to have a futile protrusion. A lens barrel disposing space on the camera body side, however, takes a rectangular or square configuration as viewing the body from the front. Accordingly, approximately triangular spaces are formed at the four corners between the lens barrel and the lens barrel disposing space on the camera body side. A high-efficiency layout can be attained by positioning the groove 1d in these spaces, so that the effects described above can be obtained without a scale-up of the camera.

FPC Guide

Referring back to FIG. 8, an FPC guide 16a provided on a body 16 will be described. The variable focal length lens barrel is advanced from the telephoto side to the collapsed position, in which process the shutter FPC 7a having the rigidity repulses the driving barrel, and hence the a radius of curvature of the driving barrel of the shutter FPC 7a tends to increase. In such a state, when the second driving barrel 3 retracts, the shutter FPC 7a is interposed between the third lens group 103 and the body 16, with the result that so-called jamming might occur. The FPC guide 16a guides the shutter FPC 7a swelling largely in such a direction as to move away from the optical axis, and thrusts the shutter FPC 7a out. The shutter FPC 7a thrust out by the FPC guide 16a is smoothly accommodated inside the groove 1d without being interposed between the third lens group 103 and the body 16. This FPC guide 16a is molded integrally with the body 16, whereby a rise in manufacturing costs can be restrained.

Third Lens Group Frame

As shown in FIG. 1 and 6, a protrusion 8b is provided on the third lens group frame 8 in the direction substantially parallel to the optical axis. This protrusion 8b is, as will hereinafter be explained, used for regulating the aperture of the shutter unit 7 in accordance with a focal length of the variable focal length lens barrel.

FIGS. 11A–11C are partial vertical sectional views, taken along the optical axis, of the variable focal length lens barrel in this embodiment. FIG. 11A shows how the lens barrel appears when collapsed. FIG. 11B shows how the lens barrel is when at the wide end. Then, FIG. 11C shows how the lens barrel is when at the telephoto end. As the variable focal length lens barrel advances from the wide end to the telephoto end, a lens group spacing between the second lens group 102 and the third lens group 103 is reduced as illustrated in FIGS. 11B and 11C. A tip of the protrusion 8b is provided with a step cam 8c having such a profile that a lift quantity is stepwise decreased in a radial direction about the vicinity of the optical axis as it approaches from the proximal end to the distal end thereof. Further, a thickness of the step cam 8c (the protrusion 8b) in a direction perpendicular to the sheet surface in FIGS. 11A–11C, i.e., a thickness dimension thereof in a peripheral direction of the circle about the vicinity of the optical axis is substantially fixed from the proximal end to the distal end thereof.

The shutter unit 7 is provided with an aperture control lever 18 which will be described in details later on. The step cam 8c and the aperture control lever 18 are, as shown in FIG. 11B, apart from but are not brought into contact with each other at the wide end. Then, a lift quantity of the aperture control lever 18 does not change stepwise corresponding to a focal length until these members come into contact with each other in a focal length region. The lift quantity comes to its maximum at the telephoto end as shown in FIG. 11C. Further, as illustrated in FIG. 11A, each inter lens group spacing is reduced for making the variable focal length lens barrel compact by reducing the entire length thereof, and the spacing between the second lens group 102 and the third lens group 103 is also decreased, with the result that the step cam 8c comes into contact with the aperture controllever18. A relative distance in the optical axis direction between the second lens group 102 and the third lens group 103 at that time, is within a variation range of the relative distance in the optical axis direction between the second lens group 102 and the third lens group 103 when the variable focal length lens barrel performs the zooming operation from the wide end to the telephoto end. Namely, it does not deviate from the variation range of the relative distance in the optical axis direction between the second lens group 102 and the third lens group 103 when collapsed, and consequently there is no necessity for providing a new notch etc for preventing interference between the shutter unit 7 and the step cam 8c especially for the collapsing process. This leads to an increase in degree of freedom of designing the shutter unit 7 and the variable focal length lens barrel.

FIGS. 12A and 12B are partially enlarged views each showing how the shutter unit 7 looks as viewed from the film surface side. FIG. 12A shows a state thereof at the wide end. FIG. 12B shows a state thereof at the telephoto end. The aperture control lever 18 is so fitted to the shutter unit 7 as to be rotatable about an axis p. One end of a torsion spring 19 is secured to a protrusion 18a of the aperture control lever 18, and the other end thereof is secured to a protrusion 7b fixed to the shutter unit 7, whereby the aperture control lever 18 is biased counterclockwise. The aperture control lever 18 is positioned in the rotating direction by a rotation stopper 7h fixed to the shutter unit 7. A notch 7d is formed in a part of the outer periphery of the shutter unit 7, and an arm 18c of the aperture control lever 18 is disposed in the notch 7d. An arm on the opposite side to the arm 18c of the aperture control lever 18 is provided with a protrusion 18b extending toward the rear side of the sheet surface, viz., toward the object side.

A sector blade 7e rotatable about the axis q is assembled inside the shutter unit 7. Note that the shutter unit 7 also incorporates a sector blade 7I (of which some portion is shown in FIG. 12A) operable facing to the sector blade 7e substantially on the same plane orthogonal to the optical axis, however, its explanation and illustration are omitted herein.

A driving pin 7f engages with an elongate hole 7g formed in the sector blade 7e, and the sector blade 7e is so driven as to open and close by the driving pin 7f. The protrusion 18b of the aperture control lever 18 has a length enough to reach the space where the sector blade 7e performing opening/closing operation. Accordingly, even when the driving pin 7g drives the sector blade 7e on such a side as to open the sector blade 7e in the state of being at the wide end shown in FIG. 12A, the sector blade 7e impinges on the protrusion 18b, whereby the aperture of the sector blade 7e is so regulated as not to be fully opened. That is, an aperture diameter determined by the sector blade 7e is smaller than an aperture diameter determined by a fixed stop 7c of the shutter unit 7. A maximum aperture diameter of the shutter unit 7 is thus controlled by the aperture control lever 18.

When the variable focal length lens barrel is positioned at the telephoto end, the shutter unit 7 and the third lens group frame 8, as shown in FIG. 11, get close to each other, and, with this operation, as shown in FIG. 12B, the protrusion 8b (the step cam 8c)intrudes the notch 7d of the shutter unit 7. Then, the arm 18c of the aperture control lever 18 is thrust by the stem cam 8c, whereby the aperture control lever 18 rotates clockwise and the protrusion 18b stays on the outer peripheral side of the shutter unit 7. In this state, when the driving pin 7g drives the sector blade 7e on such a side as to open the sector blade 7e, the sector blade 7e does not impinge on the protrusion 18b, so that the sector blade 7e is fully opened without the aperture being controlled. The aperture diameter at that time is controlled by the fixed stop 7c.

As discussed above, the third lens group frame 8 has the step cam 8c is provided extending in the direction substantially parallel to the optical axis, wherein the lift quantity thereof changes in the radial direction about the vicinity of the optical axis, and the thickness of the step cam 8c in the peripheral direction of the circle about the vicinity of the optical axis is substantially fixed. Further, the third lens group frame 8 and the shutter unit 7 rectilinearly move together within the variable focal length lens barrel and do not therefore perform relative rotational motions about the optical axis. With this construction being taken, the shutter unit 7 and the step cam 8c can be relatively moved in such a direction as to, so to speak, make the step cam 8c pierce the shutter unit 7, whereby a volume of the moving space of the step cam 8c can be reduced. That is, it is feasible to decrease a clearance of the shutter unit 7 which is provided corresponding to a moving stroke of the step cam 8c, i.e., an areal size of the notch 7d. Note that the above thickness dimension of the step cam 8c may be determined to properly take a tapered shape in consideration of a strength of the step cam 8c and of a die removability when in an injection molding process.

To give a further explanation of the effects described above, supposing that the shutter unit 7 is viewed in perspective in the optical axis direction, a large proportion of the interior of the shutter unit 7 is occupied as the moving space for the sector blades 7c, 7e. Therefore, as described above, it must be advantageous for downsizing the shutter unit 7 to minimize the clearance for avoiding the interference with the step cam 8c. In this case, it is also useful for downsizing the shutter unit 7 that the notch 7d is formed extending in the radial direction. Namely, it is, as obvious from the discussion in the prior art, comparatively easier that the notch extending in the radial direction is formed in shutter base plate taking an annular shape than by providing the notch extending in the peripheral direction.

The example has been described so far, wherein the step cam 8c is provided in the third lens group frame 8 disposed adjacent to the shutter unit 7 and relatively moving in the optical axis direction with respect to the shutter unit 7 with the zooming operation. The present invention is not, however, limited to this example. In short, if there is a member relatively moving in the optical axis direction with respect to the shutter unit 7 in accordance with the zooming operation, this member can be provided with the step cam. For instance, in the variable focal length lens barrel in this embodiment, the first lens group barrel 4 can be also provided with the step cam. It is, however, desirable that the step cam be provided in a member disposed closer to the film surface side, i.e., an image forming surface side than the shutter unit 7. The reason why so is that a light shielding member such as the bellows 11 etc and a lens barrier opening/closing mechanism etc are disposed on the object side in the shutter unit 7 in the great majority of cases. If the step cam is provided in a member closer to the object than the shutter unit 7, there might be a case where it is difficult to design the light shielding member and the lens barrier opening/closing mechanism.

There has been explained so far the case where the stop diameter is controlled corresponding to the focal length set by the variable focal length lens barrel having the built-in lens shutter. The present invention can be also, however, applied to, e.g., a lens attached to a single-lens reflex camera. In this case, a variable stop unit is disposed as a substitute for the shutter unit 7. Then, the step cam described above may control a maximum aperture of the variable stop unit.

Details of Zooming Operation and Focusing Operation

FIG. 13 is an explanatory graphic chart showing motions of the first, second and third lens groups 101, 102, 103 when the variable focal length lens barrel in this embodiment advances and retracts, wherein the axis of abscissas indicates an angle of rotation of the first driving barrel 2, and the axis of ordinates indicates a stroke in the optical axis direction. This graphic chart will hereinafter be explained in greater details.

Referring to FIG. 13, a graph NO.1 shows a moving stroke of the first driving barrel 2, which is obtained from relative rotations between the fixed barrel 1 and the first driving barrel 2. A graph NO.2 shows a relative stroke of the second driving barrel 3 to the first driving barrel 2, which is obtained from relative rotations between the first driving barrel 2 and the rectilinear advanced guide barrel 5. A graph NO. 3 shows a relative stroke of the first lens group barrel 4 to the second driving barrel 3, which is obtained from relative rotations between the second driving barrel 3 and the first lens group barrel 4. A graph NO. 4 shows a relative stroke of the third lens group frame 8 to the second driving barrel 3, which is acquired by relative rotations between the second driving barrel 3 and the rectilinear advanced guide barrel 5.

With a combination of the strokes shown in the graphs NOs.1–4 explained above, moving quantities of the first, second and third lens groups 101, 102, 103 with respect to the film surface are determined. As to the moving quantities of the respective lens groups with respect to the film surface, as shown in FIG. 13, the moving quantity of the first lens group 101 is acquired by synthesizing the graphs Nos.1, 2 and 3. Similarly, the moving quantity of the second lens group 102 is obtained by synthesizing the graphs Nos. 1 and 2, and the moving quantity of the third lens group 103 is obtained by synthesizing the graphs Nos.1, 2 and 4.

To summarize the movements of the first to third lens groups, 101–103, the first and third lens groups 101, 103 are held by the rectilinear advanced guide barrel 5 so that the lens groups 101, 103 are relatively movable in the optical axis direction with respect to the second lens group 102, and the rectilinear advanced guide barrel 5 is driven at a stroke given by a sum of the graphs Nos. 1 and 2. At this time, the first lens group 101 is driven relatively to the rectilinear advanced guide frame 5 at the stroke shown in the graph No. 3, and the third lens group 103 is driven the same at the stroke shown in the graph No. 4.

When the thus constructed variable focal length lens barrel is advanced from the collapsed position to the wide end, i.e., to a position FL1 in FIG. 13, there occurs a state in which a sharp image of the object positioned substantially at infinity at a focal length FLI is formed on the film surface. As the variable focal length lens barrel is further advanced from that position, it changes to a state where the sharp image of the object positioned at near distance at the focal length FL1 is formed on the film surface (a focusing range D1). When the variable focal length lens barrel is still further advanced, there appears a state in which the sharp image of the object positioned substantially at the infinity at a focal length FL2 via a zooming region from the focal length FL1 to FL2, is formed on the film surface. Hereinafter, when the variable focal length lens barrel is advanced likewise, with alternate repetitions of the zooming operation, i.e., the operation of changing a photographing field angle and the focusing operation, there is reached a state where the sharp image of the object positioned at near distance at a focal length FL6 at the telephoto end, is formed on the film surface. Incidentally, the focusing range is larger on the telephoto side than on the wide side as seen such as Da <D2 . . . D5<D6 in FIG. 13, however, this is because a moving quantity of an image surface with respect to a photographing distance increases as the focal length of the photographing lens becomes long. The advancing quantity in each of the focusing ranges D1, D2, . . . , D6 is controlled by a rotational quantity of the motor for driving the variable focal length lens barrel.

The advancing quantity or the retracting quantity of the variable focal length lens barrel in this embodiment of the present invention is controlled in the way described above, whereby the zooming operation and the focusing operation can be carried out by one single actuator. It is therefore possible to attain both of the downsizing of the variable focal length lens barrel and the reduction in the manufacturing costs.

Further, according to the construction described above, the cam groove 2c for driving the rectilinear advanced guide barrel 5 is formed in the first driving barrel 2, and the cam groove 3*d* for driving the third lens group 103 is formed in the second driving barrel 3, separately. It is therefore possible to restrain a scale-up of the cam barrel because of providing two types of cam grooves within on e single cam barrel, especially the scale-up in dimension thereof in the optical axis direction and also to reduce the entire length of the variable focal length lens barrel when collapsed. In this case, the complex lead threads 3*f*1–3*f*6 for driving the first lens group barrel 4 and the cam grooves 3*d*1–3*d*3 for driving the third lens group barrel 8, can be formed in overlap in the optical axis direction in the inner surface of the second driving barrel 3. Accordingly, the plurality of lens groups can be independently driven by one single driving barrel without any extension of the length of the second driving barrel 3 in the optical axis direction.

Further, the second driving barrel 3 is formed with the complex lead threads 3*f*1–3*f*6, whereby the variable focal length lens barrel can be, as will be explained hereinafter, easily designed so that the side end surfaces, on the object side, of the first and second driving barrels 2, 3 and the first lens group barrel 4 can be flush with the front surface of the body 16 when collapsed.

For making the side end surfaces, on the object side, of the first and second driving barrels 2, 3 and the first lens group barrel 4 flush with the front surface of the body 16 when collapsed, it is required that level differences between the components thereof be reduced down to zero. More specifically, it is necessary to reduce down to zero a level difference $\delta 1$ between the front side end surface of the first driving barrel 2 and the front surface of the body 16, a level difference $\delta 2$ between the front side end surface of the second driving barrel 3 and the front side end surface of the first driving barrel 2, and a level difference $\delta 3$ between the front side end surfaces of the first lens group barrel 4 and of the second driving barrel 3, which are shown in the lower part of the variable focal length lens barrel positioned at the wide end shown in FIG. 7. There is determined a rotational angle of the first driving barrel 2 which is needed for reducing the level difference $\delta 1$ down to zero among the those level differences. A profile of the cam groove 2*c* may be determined corresponding to the rotational angle of the first driving barrel 2 described above for making the level difference $\delta 2$ zero. The movement of the first lens group barrel 4 with respect to the second driving barrel 3 in the optical axis direction is, however, determined not by the cam but by the thread pairs, and besides, the lead thereof is determined based on the moving stroke needed in the photographing region of the first lens group 101 and on the rotational angle of the second driving barrel 3. The level difference $\delta 3$ can not be reduced down to zero with the thus determined lead, and hence, in the variable focal length lens barrel in this embodiment, as shown in FIG. 5, the helicoid thread formed as the complex lead thread in the internal surface of the second driving barrel 3. The first lead threads 3*b*1–3*b*6 are determined based on the rotational angle of the second driving barrel 3 through the wide end to the collapsed position and on the moving stroke of the first lens barrel 4 which is required for making the level difference $\delta 3$ zero. With the complex lead threads thus being used, a degree of freedom can be given to the setting of the moving stroke of each of the components constituting the variable focal length lens barrel.

In correspondences between the components in the embodiment of the present invention discussed above and the members in the following claims, the cam grooves 3*d*1–3*d*3 are referred to as a cam groove, the first lead threads 3*b*1–3*b*6 as a first lead thread, the second lead threads 3*d*1–3*c*6 as a second lead thread, the bending portions 3*e*1–3*e*6 as a bending portion, the complex lead threads 3*f*1–3*f*6 as a complex lead thread, the first lens group barrel 4 as a first driven member, and the third lens group frame 8 as a second driven member.

As discussed above, according to the present invention, the complex lead threads ad the cam grooves are disposed so that the complex lead threads and the cam grooves do not intersect each other at the bending portions of the complex lead threads, whereby it is feasible to enhance the degree of freedom of designing the variable focal length lens barrel and the operational reliability as well with the contrivance that the crests meshing with the roots of the complex lead threads do not come off the roots of the complex lead threads.

Further, according to the present invention, positions in which to dispose the plural streaks of complex lead threads and the plural streaks of cam grooves, are determined so that the complex lead thread and the cam groove do not intersect each other at leastwise one single bending portion, whereby it is feasible to enhance the degree of freedom of designing the variable focal length lens barrel and the operational reliability as well with the contrivance that the crests meshing with the roots of the complex lead threads do not come off the roots of the complex lead threads.

Moreover, according to the present invention, the number of streaks of the complex lead threads is set to a multiple of integer over twice the number of the cam grooves, whereby the positions of disposing the complex lead threads and the cam grooves can be set corresponding to the profile of the cam groove so that the complex lead threads and the cam grooves do not intersect each other at the bending portions of the complex lead threads.

Incidentally, for the variable focal length lens barrel assembled into the lens shutter camera, there has hitherto been proposed the lens barrel advancing mechanism structured to alternately repeating the zooming operation and the focusing operation subsequent to lens barrel advancing/retracting operations. According to the thus structured lens barrel advancing/retracting mechanism, an actuator for driving the lens barrel to perform the zooming operation (which will hereinafter be termed a "zooming actuator" in this specification) can be used in common as an actuator for moving the lenses for focusing (which will hereinafter be called a "focusing actuator" in this specification). This might be advantageous In terms of reducing manufacturing costs and both a size and a weight of the camera.

The variable focal length lens barrel structured to alternately repeating the zooming operation and the focusing operation as described above, has taken a so-called two lens group type as a geometry for changing a synthesized focal length of a photographing lens by varying distances between a plurality of lens groups disposed inside.

In the variable focal length lens barrel having the two lens group type of geometry, the first lens group and the second lens group are respectively moved along independent moving trajectories, thus repeating the zooming operation and the focusing operation. To be specific, the first lens group is so driven as to advance and retract by a helicoid mechanism, while the second lens group is driven by a cam assuming a cam profile that is sinuous in zigzag having a plurality of bending points, wherein a relative distance to the first lens group thus varies.

When the variable focal length lens barrel is moved from, e.g., a short focal point side to a long focal point side, there is repeated a process such as a change in focal length → a movement of focal surface → a change in focal length → movement of focal surface in accordance with the zigzag of the cam groove. The zooming actuator and the focusing actuator can be used in common by utilizing the movement of the focal surface for the focusing.

In the variable focal length lens barrel explained above, the focal length changes intermittently with the zooming operation, and hence a photographer is unable to set the variable focal length lens barrel to an arbitrary focal length between the wide end (where the focal length is minimized) and the telephoto end (where the focal length is maximized). The photographer might, however, feel almost no sense of incongruity owing to a proper increment of the bending points in the profile of the cam groove, and is able to operate the camera by setting it at a field angle as the photographer intends.

Incidentally, when increasing a zooming ratio of the variable focal length lens barrel, there might be a problem in which a full F-number on the side of the long focal length tends to increase (get slower) in the above-described two lens group type. It is desirable for obviating this problem that the variable focal length lens barrel be structured as a three lens group type with respect to the variable focal length lens having a high zooming ratio.

In a case where the variable focal length lens barrel is structured as a three lens group, for example, there is a method of providing one driving barrel with cam grooves for moving the second and third lens groups in the optical axis direction. According to this method, the driving barrel to which the first lens group is fixed is moved In the optical axis direction by the helicoid mechanism, and simultaneously the second and third lens groups are moved along the cam grooves to perform the zooming operation.

If the zooming actuator and the focusing actuator are structured in common in the three lens group type variable focal length lens barrel, however, the variable focal length lens barrel might, it is not preferable, increase in size for the reason which will hereinafter be elucidated.

In a case where the second and third lens groups so held as to be movable in the optical axis direction within one single movable frame are moved along the cam grooves formed in one cam barrel, in a type of having independently the zooming actuator and the focusing actuator, the cam grooves for the second and third lens groups can be formed in overlap in the optical axis direction. This is because the majority of profiles of the cam grooves for moving the second and third lens groups do not have bending points and, if any, there must be little waviness thereof, whereby the cam grooves for the second and third lens groups can be alternately formed so as not to intersect each other within one single cam barrel. Namely, the two categories of cam grooves can be provided in a compact fashion, thereby making it feasible to reduce the length of the movable frame In the optical axis direction.

On the other hand, in such a type that the zooming actuator and the focusing actuator are structured in common, as described above, the profile of the cam groove becomes sinuous in zigzag, and hence it is difficult that the cam grooves for moving the second and third lens groups are formed in overlap in the optical axis direction. Therefore, it is required for forming the cam grooves for the second and third lens groups in one single cam barrel. That the cam grooves for the second and third lens groups be spaced away from each other in the optical axis direction so as not intersect each other. Then, the cam barrel elongates, and a length of the variable focal length lens barrel when collapsed also increases, with the result that the camera can not be reduced in thickness.

Then, with the following configuration, it is feasible to downsize the three lens group type variable focal length lens barrel capable of alternately executing the zooming operation and the focusing operation subsequent to the advancing/retracting operations of the lens barrel.

This configuration will be explained corresponding to what is shown in FIG. 2.

The variable focal length lens barrel has the movable frame 5 for holding the second lens group 6, and holding the first lens group 4 disposed anterior to the second lens group 6 and the third lens group 8 disposed posterior to the second lens group 6 so that the lens groups 4, 8 are each movable in the optical axis direction, the first driving barrel 2, having the first cam groove 2c formed in the inner surface of the barrel, for moving the movable frame 5 in the optical axis direction with a moving quantity determined based on a rotational angle about the optical axis and on a profile of the first cam groove 2c, and the second driving barrel 3, formed with the helicoid thread 3f including the root having a first depth in the inner peripheral surface of the barrel and the second bottomed cam groove 3d having a second depth deeper than the first depth so that the helicoid thread 3f and the second cam groove 3d are provided in overlap, for relatively moving the first lens group 4 with respect to the movable frame 5 in the optical axis direction with a moving quantity determined based on the rotational angle about the optical axis and on a lead of the helicoid thread 3f, and for relatively moving the third lens group 8 with respect to the movable frame in the optical axis direction with a moving quantity determined based on the rotational angle about the optical axis and on a profile of the second cam groove 3d.

In this construction, it is preferable that the movable frame 5 further includes the rectilinear advanced guide members 5b, 5d for permitting the relative movements of the first lens group 4 and the third lens group 8 with respect to the movable frame 5 in the optical axis direction, and regulating the relative movements in the direction about the optical axis.

Further, in the construction described above, it is preferable that the first driving barrel 2 and the second driving barrel 3 rotate about the optical axis to advance the movable frame 5, and, with this operation, the first, second and third lens groups, 4, 6, 8, are consecutively moved from a position of forming on the film surface the sharp image of the object positioned substantially in infinity at a first photographing field angle, to a position of forming on the film surface the sharp image of the object positioned at a comparatively near distance at a field angle approximately equal to the first photographing field angle, and further from a position of forming on the film surface the sharp image of the object positioned substantially at infinity at a second photographing field angle smaller than the first photographing field angle, to a position of forming on the film surface the sharp image of the object positioned at the comparatively near distance at a field angle approximately equal to the second photographing field angle.

According to the construction described above, the movable frame for respectively holding the second lens group and holding the first lens group disposed anterior to the second lens group and the third lens group disposed posterior to the second lens group so as to be movable in the optical axis direction, is moved in the optical axis direction through the first driving barrel of which the inner surface is formed with the first cam groove. The first and third lens groups are relatively moved in the optical axis direction with respect to the second lens group through the second driving barrel of which the inner surface is formed with the helicoid thread and the second cam groove in overlap. The lengths of the first and second driving barrels in the optical axis direction can be thereby reduced. It is therefore possible to decrease the thickness of the camera by educing the entire length of the variable focal length lens in the optical axis direction when collapsed. In this case, the first and third lens groups 4, 8 are respectively moved along the helicoid thread and the cam groove formed in overlap in the inner surface of the one single barrel, whereby the number of components and a major diameter of the lens barrel can be reduced to greater degrees than in such a geometry that the helicoid thread and the cam grooves for respectively moving the first and third lens groups 4, 8 are formed in separate barrels.

Moreover, according to the above-mentioned preferable construction, the movable frame is formed with the rectilinear advanced guide members for permitting the relative movements of the first lens group and the third lens group with respect to the movable frame in the optical axis direction, and regulating the relative movements in the direction about the optical axis, i.e., the one single lens barrel constructive member is provided with the rectilinear advanced guide member for regulating the movements of the plurality of members in the rotating direction, whereby the number of the lens barrel constructive members can be reduced. It is therefore feasible to downsize the variable focal length lens barrel and decrease the manufacturing costs. Further, the relative movements of the first and third lens groups about the optical axis are regulated based on the one single member, and hence a relative backlash between the first and third lens groups about the optical axis can be reduced enough to enhance an accuracy of the lens barrel and enable a decline of an optical performance of the variable focal length lens to be restrained.

Still further, according to the preferable construction given above, the first and second driving barrels rotate about the optical axis to advance the movable frame, and, for this operation, are formed separately with the cam grooves, to be more specific, the first and second cam grooves that are sinuous in zigzag for consecutively alternately performing the zooming operation and the focusing operation. Accordingly, it is feasible to reduce both the length of the lens barrel in the optical axis direction when collapsed and the thickness of the camera to greater degrees than in the configuration where the first and second cam grooves are spaced away from each other in the optical axis direction so as not to intersect each other in one single barrel.

What is claimed is:

1. A variable focal length lens barrel comprising:

a bottomed cam groove having a first depth; and a complex lead thread structured so that a root of a first lead thread extending linearly in a first direction and having a first lead is connected directly via a portion to a root of a second lead thread extending linearly in a second direction differing from said first direction and having a second lead, said complex lead thread having a thread bottom of a second depth shallower than the first depth, wherein said cam groove and said complex lead thread are disposed in overlap on one single barrel so as not to intersect each other at said [bending] portion.

2. A variable focal length lens barrel according to claim 1, wherein a plurality of said cam grooves and said complex lead threads are formed, said complex lead threads are multi-streak threads having a plurality of streaks extending parallel to each other, and positions of disposing said plural streaks of complex lead threads and said plurality of cam grooves are determined so that said complex lead thread and said cam groove do not intersect each other at least said one connected portion among said connected portions included respectively in said plural streaks of complex lead threads.

3. A variable focal length lens barrel according to claim 2, wherein the number of said plural streaks of complex lead threads formed on said barrel is a multiple of integer that is equal to or more than twice the number of said cam grooves formed on said barrel.

4. A variable focal length lens barrel comprising:

a cam groove having a first depth; and a complex lead thread structured so that a first lead thread extending linearly in a first direction is connected directly via a portion to a second lead thread extending linearly in a second direction differing from said first direction, said complex lead thread having a thread bottom of a second depth shallower than the first depth, wherein said cam groove and said complex lead thread are disposed in overlap so as not to intersect each other at said portion.

* * * * *

UNITED STATES PATENT AND TRADEMARK OFFICE
CERTIFICATE OF CORRECTION

PATENT NO. : 6,195,212 B1
DATED : February 22, 2001
INVENTOR(S) : Hidenori Miyamoto It is certified that error appears in the above-identified patent and that said Letters Patent is hereby corrected as shown below:

Column 26,
Line 12, after "first depth" begin a new paragraph;
Line 14, delete "[bending]";
Line 18, after "formed," begin a new paragraph.

Signed and Sealed this

Thirty-first Day of July, 2001

*Attest:*

NICHOLAS P. GODICI
*Attesting Officer*     *Acting Director of the United States Patent and Trademark Office*